US012164264B2

(12) United States Patent
Funaba et al.

(10) Patent No.: US 12,164,264 B2
(45) Date of Patent: Dec. 10, 2024

(54) TONER FOR ELECTROSTATIC CHARGE IMAGE DEVELOPMENT, ELECTROSTATIC CHARGE IMAGE DEVELOPER, AND IMAGE FORMING APPARATUS

(71) Applicant: FUJIFILM Business Innovation Corp., Tokyo (JP)

(72) Inventors: Koji Funaba, Kanagawa (JP); Yuka Ishihara, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 507 days.

(21) Appl. No.: 17/592,850

(22) Filed: Feb. 4, 2022

(65) Prior Publication Data

US 2023/0095406 A1 Mar. 30, 2023

(30) Foreign Application Priority Data

Sep. 27, 2021 (JP) ................................ 2021-157172

(51) Int. Cl.

| | |
|---|---|
| ***G03G 9/087*** | (2006.01) |
| ***G03G 9/08*** | (2006.01) |
| ***G03G 9/097*** | (2006.01) |
| ***G03G 15/08*** | (2006.01) |

(52) U.S. Cl.

CPC ....... *G03G 9/08755* (2013.01); *G03G 9/0819* (2013.01); *G03G 9/0821* (2013.01); *G03G 9/0827* (2013.01); *G03G 9/09733* (2013.01); *G03G 15/0865* (2013.01)

(58) Field of Classification Search

CPC ............ G03G 9/08755; G03G 9/0819; G03G 9/0821; G03G 9/0827; G03G 9/09733; G03G 15/0865; G03G 9/08782; G03G 9/08797; G03G 9/08795

See application file for complete search history.

(56) References Cited

U.S. PATENT DOCUMENTS

| | | | | |
|---|---|---|---|---|
| 2012/0196218 A1* | 8/2012 | Hong | G03G 9/08797 | 430/108.7 |
| 2016/0195827 A1* | 7/2016 | Murayama | G03G 15/0126 | 430/105 |
| 2020/0310271 A1* | 10/2020 | Sakamoto | G03G 15/0865 | |

FOREIGN PATENT DOCUMENTS

| | | |
|---|---|---|
| JP | 04-274253 A | 9/1992 |
| JP | 2001-201887 A | 7/2001 |
| JP | 2002-072551 A | 3/2002 |

* cited by examiner

*Primary Examiner* — Stewart A Fraser
(74) *Attorney, Agent, or Firm* — Sughrue Mion, PLLC

(57) ABSTRACT

A toner for electrostatic charge image development has toner particles containing a binder resin including 90 mass % or more of an amorphous resin. In a differential molecular weight distribution curve of tetrahydrofuran soluble matter as measured by gel permeation chromatography, the toner has a maximum peak Ma in a molecular weight range of 2,500 or more and 8,000 or less, a minimum value Mm in a molecular weight range of more than 8,000 and less than 280,000, and a maximum peak Mb in a molecular weight range of 280,000 or more and 900,000 or less. When the area of the differential molecular weight distribution curve in a range of a molecular weight of 100 or more and less than the minimum value Mm is defined as A, and the area of the differential molecular weight distribution curve in a range of the minimum value Mm or more and a molecular weight of 10,000,000 or less is defined as B, the area ratio A/B is 5.5 or more and 10 or less.

14 Claims, 2 Drawing Sheets

TONER FOR ELECTROSTATIC CHARGE IMAGE DEVELOPMENT, ELECTROSTATIC CHARGE IMAGE DEVELOPER, AND IMAGE FORMING APPARATUS

CROSS-REFERENCE TO RELATED APPLICATIONS

This application is based on and claims priority under 35 USC 119 from Japanese Patent Application No. 2021-157172 filed Sep. 27, 2021.

BACKGROUND

(i) Technical Field

The present disclosure relates to a toner for electrostatic charge image development, an electrostatic charge image developer, and an image forming apparatus.

(ii) Related Art

A technique for visualizing image information, such as electrophotography, is currently used in various fields. Electrophotography involves forming electrostatic charge images as image information on the surface of an image holding member by means of charging and electrostatic charge image formation. A toner image is formed on the surface of the image holding member by using a developer containing toner, and the toner image is transferred to a recording medium and then fixed to the recording medium. The image information is visualized as an image through these processes.

For example, Japanese Unexamined Patent Application Publication No. 04-274253 discloses "a magnetic toner for electrostatic charge image development including at least a binder resin and a magnetic substance, wherein the THF insoluble matter of the binder resin is less than 10 wt % based on the binder resin, and the THF soluble matter of the binder resin has a weight average molecular weight/number average molecular weight (Mw/Mn) 8 as measured by gel permeation chromatography (GPC) and shows a molecular weight peak MA in a molecular weight range from 15,000 to 40,000, a molecular weight peak MB in a molecular weight range from 380,000 to 1,000,000, and a molecular weight minimum value Md in a molecular weight range from 40,000 to 380,000, and MB/MA=10 to 70, and when the area of the differential molecular weight distribution curve from molecular weights 400 to Md is defined as SA, the area of the differential molecular weight distribution curve of molecular weights Md to 5,000,000 is defined as SB, and the area defined by the differential molecular weight distribution curve and the straight line connecting the top of the molecular weight peak MA and the top of the molecular weight peak MB is defined as Sd, SA:SB:Sd=1:0.2 to 0.5:0.2 to 0.5."

Japanese Unexamined Patent Application Publication No. 2001-201887 discloses "a toner for electrostatic charge image development including at least a binder resin, a colorant, and a wax, wherein the proportion of THF soluble matter having a molecular weight of $5\times10^5$ or more in the integral molecular weight distribution of the THF soluble matter of the toner as measured by GPC is 1 wt % or less, the proportion of THF soluble matter having a molecular weight of $3\times10^3$ or less in the integral molecular weight distribution is 30 wt % or less, and the ratio $W(5\times10^3)/W(1\times10^5)$ of the proportion $W(5\times10^3)$ of THF soluble matter having a molecular weight of $5\times10^5$ or less in the integral molecular weight distribution to the proportion $W(1\times10^5)$ of THF soluble matter having a molecular weight of $1\times10^3$ or more in the integral molecular weight distribution is 15 to 50.

SUMMARY

Toner for electrostatic charge image development known in the related art tends to decrease its resistance to thermal aggregation with increasing fixability. Aspects of non-limiting embodiments of the present disclosure relate to a toner for electrostatic charge image development having toner particles containing a binder resin, wherein the toner has both better fixability and higher resistance to thermal aggregation than a toner for electrostatic charge image development where the area ratio A/B described below is less than 5.5 or more than 10, or the ratio (Ha/Hb) described below is less than 2.7 or more than 6.0.

According to an aspect of the present disclosure, there is provided a toner for electrostatic charge image development including toner particles containing a binder resin including 90 mass % or more of an amorphous resin, wherein, in a differential molecular weight distribution curve of tetrahydrofuran soluble matter as measured by gel permeation chromatography, the toner has: a maximum peak Ma in a molecular weight range of 2,500 or more and 8,000 or less; a minimum value Mm in a molecular weight range of more than 8,000 and less than 280,000; and a maximum peak Mb in a molecular weight range of 280,000 or more and 900,000 or less, and, when the area of the differential molecular weight distribution curve in a range of a molecular weight of 100 or more and less than the minimum value Mm is defined as A, and the area of the differential molecular weight distribution curve in a range of the minimum value Mm or more and a molecular weight of 10,000,000 or less is defined as B, the area ratio A/B is 5.5 or more and 10 or less.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

BRIEF DESCRIPTION OF THE DRAWINGS

Exemplary embodiments of the present disclosure will be described in detail based on the following figures, wherein.

DETAILED DESCRIPTION

Figure 1:
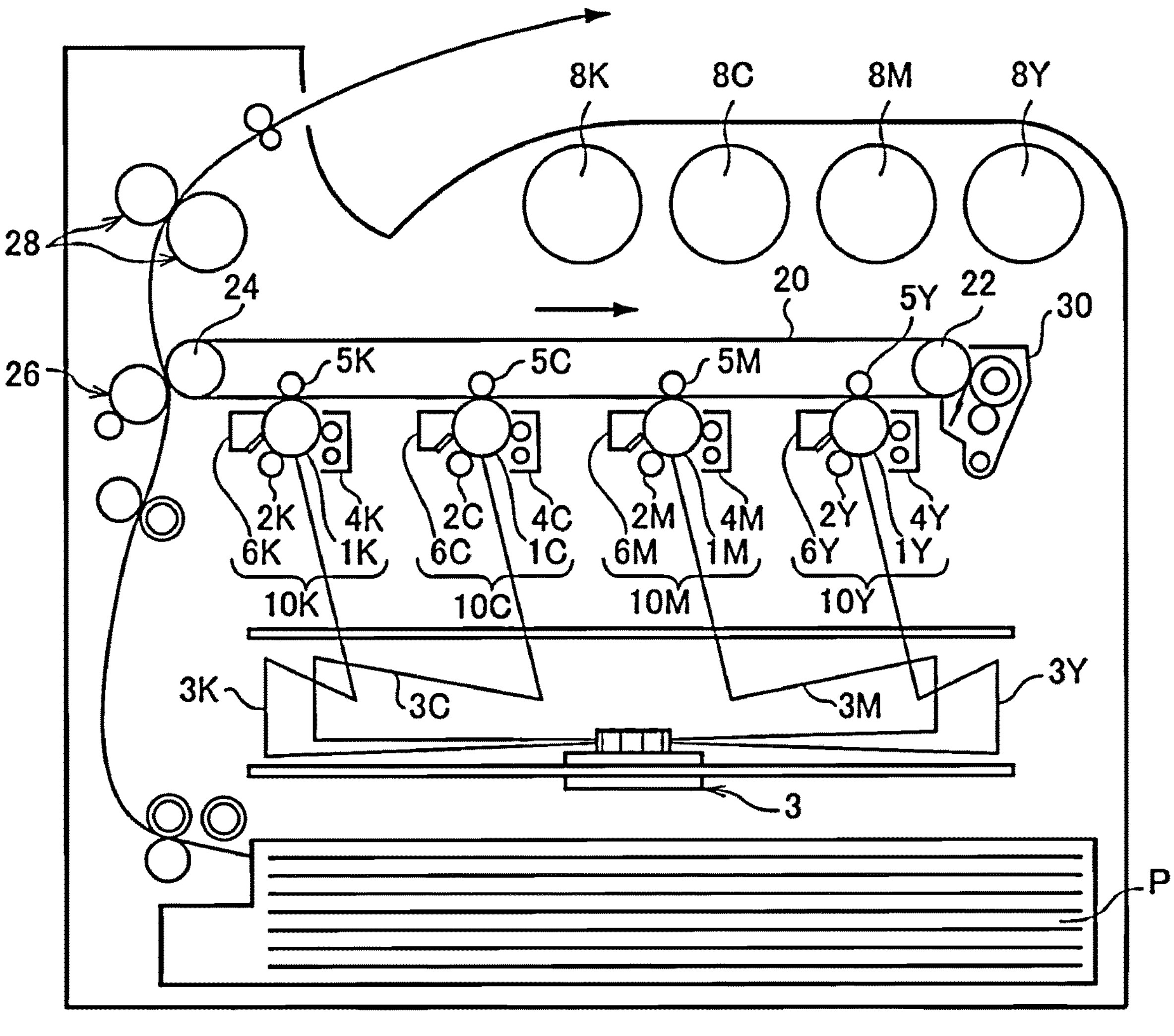
FIG. 1 is a schematic structural view of an example of an image forming apparatus according to an exemplary embodiment.

Exemplary embodiments of the present disclosure will be described below. The following description and Examples are for illustrating the present disclosure, but are not intended to limit the present disclosure.

The numerical ranges expressed by using "to" in this specification indicate ranges including the numerical values before and after "to" as the minimum value and the maximum value.

In the numerical ranges described stepwise in the present disclosure, the upper limit or the lower limit of one numerical range may be replaced by the upper limit or the lower limit of another numerical range described stepwise. The upper limit or lower limit of any numerical range described in the present disclosure may be replaced by a value described in Examples.

In this specification, the term "step" includes not only an independent step but also a step that cannot be clearly distinguished from other steps but may accomplish an intended purpose.

In the description of exemplary embodiments with reference to the drawings in this specification, the structures of the exemplary embodiments are not limited to the structures illustrated in the drawings. The sizes of members in each figure are schematic, and the relative relationship between the sizes of the members is not limited to what is illustrated.

In this specification, each component may include two or more corresponding substances. In the present disclosure, the amount of each component in a composition refers to, when there are two or more substances corresponding to each component in the composition, the total amount of the substances present in the composition, unless otherwise specified.

In this specification, two or more types of particles corresponding to each component may be contained. The particle size of each component refers to, when there are two or more types of particles corresponding to each component in the composition, the particle size of a mixture of two or more types of particles present in the composition, unless otherwise specified.

In this specification, the "toner for electrostatic charge image development" is also referred to simply as a "toner", and the "electrostatic charge image developer" is also referred to simply as a "developer."

Electrostatic Charge Image Development Toner

A toner according to a first exemplary embodiment has toner particles containing a binder resin including 90 mass % or more of an amorphous resin. In a differential molecular weight distribution curve of tetrahydrofuran soluble matter as measured by gel permeation chromatography, the toner has a maximum peak Ma in a molecular weight range of 2,500 or more and 8,000 or less, a minimum value Mm in a molecular weight range of more than 8,000 and less than 280,000, and a maximum peak Mb in a molecular weight range of 280,000 or more and 900,000 or less. When the area of the differential molecular weight distribution curve in a range of a molecular weight of 100 or more and less than the minimum value Mm is defined as A, and the area of the differential molecular weight distribution curve in a range of the minimum value Mm or more and a molecular weight of 10,000,000 or less is defined as B, the area ratio A/B is 5.5 or more and 10 or less.

A toner according to a second exemplary embodiment has toner particles containing a binder resin including 90 mass % or more of an amorphous resin. In a differential molecular weight distribution curve of tetrahydrofuran soluble matter as measured by gel permeation chromatography, the toner has a maximum peak Ma in a molecular weight range of 2,500 or more and 8,000 or less, a minimum value Mm in a molecular weight range of more than 8,000 and less than 280,000, and a maximum peak Mb in a molecular weight range of 280,000 or more and 900,000 or less. The maximum peak Ma has a full width at half maximum of 12,000 or more and 20,000 or less, and the maximum peak Mb has a full width at half maximum of 320,000 or more and 500,000 or less. The ratio (Ha/Hb) of a height Ha of the maximum peak Ma to a height Hb of the maximum peak Mb is 2.7 or more and 6.0 or less.

The toners according to the first exemplary embodiment and the second exemplary embodiment have both good fixability and high resistance to thermal aggregation because of the configurations described above. The reason for this is assumed as described below.

Toner in the related art is known to include, for example, toner particles containing a binder resin including more than 20 mass % of crystalline resin relative to the entire resin in order to improve fixability. However, when the crystalline resin is contained in the above range, toner particles tend to aggregate, that is, the resistance to thermal aggregation tends to decrease, after storage in a high temperature-high humidity environment (e.g., 55° C., 50% RH) for a long time (e.g., 20 hours) although the fixability (particularly, low-temperature fixability at, for example, 160° C. or lower) is improved.

The toner according to the first exemplary embodiment has a binder resin including 90 mass % or more of an amorphous resin. The binder resin has at least one or more maximum peaks in each of the molecular weight range of 2,500 or more and 8,000 or less and the molecular weight range of 280,000 or more and 900,000 or less. In other words, the binder resin contains a resin having a relatively lower molecular weight and a resin having a relatively higher molecular weight.

In addition, the toner according to the first exemplary embodiment has an area ratio A/B of 5.5 or more and 10 or less in the differential molecular weight distribution curve. In other words, when the differential molecular weight distribution curve is divided at the minimum value Mm, the proportion of the resin having a relatively lower molecular weight is reasonably larger than the proportion of the resin having a relatively higher molecular weight. The presence of the resin having a relatively lower molecular weight at the above ratio may provide fixability. The presence of the resin having a relatively higher molecular weight in the above range may provide resistance to thermal aggregation.

Like the toner according to the first exemplary embodiment, the toner according to the second exemplary embodiment has a binder resin including 90 mass % or more of an amorphous resin, and the binder resin includes the resin having a relatively lower molecular weight and the resin having a relatively higher molecular weight.

For the toner according to the second exemplary embodiment, the maximum peak Ma has a full width at half maximum of 12,000 or more and 20,000 or less, and the maximum peak Mb has a full width at half maximum of 320,000 or more and 500,000 or less. The ratio (Ha/Hb) of a height Ha of the maximum peak Ma to a height Hb of the maximum peak Mb is 2.7 or more and 6.0 or less. In other words, the proportion of the resin having a relatively lower molecular weight and having the maximum peak Ma is reasonably larger than the proportion of the resin having a relatively higher molecular weight and having the maximum peak Mb. The presence of the resin having a relatively lower molecular weight at the above ratio may provide fixability. The presence of the resin having a relatively higher molecular weight in the above range may provide resistance to thermal aggregation.

In particular, the resin component having a relatively lower molecular weight present in an appropriate amount in the toner according to the first exemplary embodiment and the toner according to the second exemplary embodiment provides good fixability at low temperature (e.g., 160° C. or lower) even when the proportion of crystalline resin in the entire resin is less than 20 mass %.

Hereinafter, the toner corresponding to both the toner according to the first exemplary embodiment and the toner according to the second exemplary embodiment is also referred to as "the toner according to this exemplary embodiment".

The toner according to this exemplary embodiment has toner particles. The toner may have external additives externally added to the toner particles.

Properties of Toner Molecular Weight Curve, Weight Average Molecular Weight

In the differential molecular weight distribution curve of the tetrahydrofuran soluble matter as measured by gel permeation chromatography, the toner according to this exemplary embodiment has a maximum peak Ma in a molecular weight range of 2,500 or more and 8,000 or less, a minimum value Mm in a molecular weight range of more than 8,000 and less than 280,000, and a maximum peak Mb in a molecular weight range of 280,000 or more and 900,000 or less.

The maximum peak Ma refers to the maximum value of a peak observed in a molecular weight range of 2,500 or more and 8,000 or less in the differential molecular weight distribution curve. For example, when two or more peaks are observed in the molecular weight range of 2,500 or more and 8,000 or less, the maximum peak Ma refers to the maximum value in the highest peak of the differential distribution values.

The maximum peak Mb refers to the maximum value of a peak observed in a molecular weight range of 280,000 or more and 900,000 or less in the differential molecular weight distribution curve. For example, when two or more peaks are observed in the molecular weight range of 280,000 or more and 900,000 or less, the maximum peak Mb refers to the maximum value in the highest peak of the differential distribution values.

The minimum value Mm refers to the minimum value of the differential distribution values observed in the molecular weight range of 8,000 or more and less than 280,000 in the differential molecular weight distribution curve. For example, when two or more minimum values (i.e., peak valleys) are observed in the molecular weight range of 8,000 or more and less than 280,000, the minimum value Mm refers to a peak valley corresponding to the minimum differential distribution value.

The maximum peak Ma in the molecular weight range of 2,500 or more and 8,000 or less and the maximum peak Mb in the molecular weight range of 280,000 or more and 900,000 or less are each from the binder resin, and preferably from an amorphous resin.

A specific method for controlling the maximum peak Ma, the minimum value Mm, and the maximum peak Mb in the above ranges is not limited, but the maximum peak Ma, the minimum value Mm, and the maximum peak Mb may be controlled by, for example, preparing the binder resin so as to include an amorphous resin al having a weight average molecular weight of 8,000 or more and 280,000 or less (more preferably 10,000 or more and 25,000 or less) and an amorphous resin b1 having a weight average molecular weight of 300,000 or more and 1,100,000 or less (more preferably 350,000 or more and 900,000 or less).

The molecular weight curve and the weight average molecular weight are measured by using a gel permeation chromatography (GPC) system (HLC-8420GCP, available from Tosoh Corporation), a column TSKgel SuperHM-M (15 cm) available from Tosoh Corporation, and a tetrahydrofuran (THF) solvent. From this measurement result, the molecular weight curve is obtained by using a monodisperse polystyrene standard. The weight average molecular weight is calculated by using the obtained differential molecular weight distribution curve. In the differential molecular weight distribution curve, the horizontal axis represents the logarithmic value (Log M) of the molecular weight, and the vertical axis represents the differential distribution value (dw/d(Log M)).

Area Ratio A/B

The toner according to the first exemplary embodiment has an area ratio A/B of 5.5 or more and 10 or less, preferably has an area ratio A/B of 6.0 or more and 9.0 or less, more preferably has an area ratio A/B of 6.1 or more and 8.5 or less to provide the toner with both good fixability and high resistance to thermal aggregation, when the area of the differential molecular weight distribution curve in a range of a molecular weight of 100 or more and less than the minimum value Mm is defined as A, and the area of the differential molecular weight distribution curve in a range of the minimum value Mm or more and a molecular weight of 10,000,000 or less is defined as B.

The toner according to the second exemplary embodiment preferably has an area ratio A/B of 5.5 or more and 10 or less, more preferably has an area ratio A/B of 6.0 or more and 9.0 or less, still more preferably has an area ratio A/B of 6.1 or more and 8.5 or less to provide the toner with both good fixability and high resistance to thermal aggregation, when the area of the differential molecular weight distribution curve in a range of a molecular weight of 100 or more and less than the minimum value Mm is defined as A, and the area of the differential molecular weight distribution curve in a range of the minimum value Mm or more and a molecular weight of 10,000,000 or less is defined as B.

A specific method for controlling the area ratio A/B in the above range is not limited, but the area ratio A/B may be controlled by, for example, adjusting the mixing ratio of the amorphous resin al having a weight average molecular weight of 8,000 or more and 28,000 or less (more preferably 10,000 or more and 25,000 or less) and the amorphous resin b1 having a weight average molecular weight of 300,000 or more and 1,100,000 or less (more preferably 350,000 or more and 900,000 or less) to prepare a binder resin.

Full Width at Half Maximum

To provide the toner according to the first exemplary embodiment with both good fixability and high resistance to thermal aggregation, the full width at half maximum of the maximum peak Ma is preferably 8,000 or more and 27,000 or less, more preferably 9,000 or more and 25,000 or less, still more preferably 12,000 or more and 20,000 or less, yet still more preferably 13,000 or more and 19,000 or less, yet still more preferably 14,000 or more and 18,000 or less.

For the toner according to the second exemplary embodiment, the full width at half maximum of the maximum peak Ma is 12,000 or more and 20,000 or less, preferably 13,000 or more and 19,000 or less, more preferably 14,000 or more and 18,000 or less in order to provide the toner with both good fixability and high resistance to thermal aggregation.

To provide the toner according to the first exemplary embodiment with both good fixability and high resistance to thermal aggregation, the full width at half maximum of the maximum peak Mb is preferably 200,000 or more and 800,000 or less, more preferably 250,000 or more and 700,000 or less, still more preferably 320,000 or more and 500,000 or less, yet still more preferably 350,000 or more and 490,000 or less, yet still more preferably 370,000 or more and 470,000 or less.

For the toner according to the second exemplary embodiment, the full width at half maximum of the maximum peak Mb is 320,000 or more and 500,000 or less, preferably 350,000 or more and 490,000 or less, more preferably 370,000 or more and 470,000 or less in order to provide the toner with both good fixability and high resistance to thermal aggregation.

A specific method for controlling each full width at half maximum in the above range is not limited, but each full width at half maximum may be controlled by, for example, adjusting the amount of catalyst, the mixing ratio of monomers, the reaction rate, and the like in synthesizing the binder resin; or preparing the binder resin so as to include the amorphous resin al having a weight average molecular weight of 8,000 or more and 28,000 or less (more preferably 10,000 or more and 25,000 or less) and the amorphous resin b1 having a weight average molecular weight of 300,000 or more and 1,100,000 or less (more preferably 350,000 or more and 900,000 or less).

The full width at half maximum of the maximum peak Ma is determined in the following manner.

First, a straight line B parallel to the baseline is drawn from a starting point at the minimum value Mm. Subsequently, the direct distance between the maximum peak Ma and the point Ma0 at which a straight line from the maximum peak Ma intersects the straight line B at right angles is defined as a "height of the maximum peak Ma". The peak width (full width at half maximum) at a height of half the height (differential distribution value) of the obtained maximum peak Ma is defined as a full width at half maximum of the maximum peak Ma.

The full width at half maximum of the maximum peak Mb is determined in the following manner.

First, a straight line B parallel to the baseline is drawn from a starting point at the minimum value Mm. Subsequently, the direct distance between the maximum peak Mb and the point Mb0 at which a straight line from the maximum peak Mb intersects the straight line B at right angles is defined as a "height of the maximum peak Mb". The peak width (full width at half maximum) at a height of half the height (differential distribution value) of the obtained maximum peak Mb is defined as a full width at half maximum of the maximum peak Mb.

Ratio (Ha/Hb)

To provide the toner according to the first exemplary embodiment with both good fixability and high resistance to thermal aggregation, the ratio (Ha/Hb) of the height Ha of the maximum peak Ma to the height Hb of the maximum peak Mb is preferably 2.3 or more and 7.0 or less, more preferably 2.5 or more and 6.5 or less, still more preferably 2.7 or more and 6.0 or less, yet still more preferably 2.8 or more and 5.9 or less, yet still more preferably 2.9 or more and 5.8 or less.

For the toner according to the second exemplary embodiment, the ratio (Ha/Hb) of the height Ha of the maximum peak Ma to the height Hb of the maximum peak Mb is 2.7 or more and 6.0 or less, more preferably 2.8 or more and 5.9 or less, still more preferably 2.9 or more and 5.8 or less in order to provide the toner with both good fixability and high resistance to thermal aggregation.

(Mb−Mm)/(Mm−Ma)

To provide the toner according to this exemplary embodiment with both good fixability and high resistance to thermal aggregation, the relationship (Mb−Mm)/(Mm−Ma) among the maximum peak Ma, the minimum value Mm, and the maximum peak Mb is preferably 1.0 or more and 2.4 or less, more preferably 1.2 or more and 2.35 or less, still more preferably 1.3 or more and 2.3 or less.

A specific method for controlling the ratio (Ha/Hb) and the ratio (Mb−Mm)/(Mm−Ma) in the above ranges is not limited, but the ratio (Ha/Hb) and the ratio (Mb−Mm)/(Mm−Ma) may be controlled by, for example, adjusting the mixing ratio of the amorphous resin al having a weight average molecular weight of 8,000 or more and 28,000 or less (more preferably 10,000 or more and 25,000 or less) and the amorphous resin b1 having a weight average molecular weight of 300,000 or more and 1,100,000 or less (more preferably 350,000 or more and 900,000 or less) to prepare a binder resin.

Properties of Toner Particles

The toner particles may be toner particles having a single-layer structure, or may be toner particles each having so-called a core-shell structure including a core (core particle) and a coating layer (shell layer) coating the core.

The toner particles having a core-shell structure include, for example, a core containing a binder resin and other optional additives, such as a colorant and a release agent; and a coating layer containing a binder resin.

The toner particles preferably contain 3 mass % or more and 8 mass % or less of toluene insoluble matter, more preferably contain 3.5 mass % or more and 7.5 mass % or less of toluene insoluble matter, still more preferably contain 4 mass % or more and 7 mass % or less of toluene insoluble matter relative to the toner particles in order to provide the toner with both good fixability and high resistance to thermal aggregation.

The toluene insoluble matter is measured by the following method.

A sample (250 mg) is directly weighed in an Erlenmeyer flask, and the weight is recorded up to 0.1 mg order. Toluene (20 ml) is poured into the Erlenmeyer flask, and the Erlenmeyer flask is tightly sealed. The mixture is stirred with a stirrer for 4 hours to dissolve the sample. The resulting solution is transferred to a centrifuge tube. Toluene (20 ml) is further poured into the empty Erlenmeyer flask to rinse the inside of the Erlenmeyer flask, and the toluene is also added to the centrifuge tube, which is then sealed with a cap. The centrifuge tube is centrifuged at −9° C. and 12,000 rpm for 20 minutes. The centrifuge tube after centrifugation is placed at room temperature for about 2 hours so that the temperature of the solution returns to room temperature. An empty aluminum dish is weighed, and the weight is recorded up to 0.1 mg order. The supernatant (5 ml) of the solution in the centrifuge tube is sucked with a pipette and transferred to the aluminum dish. The aluminum dish is placed on a heated electric griddle to evaporate a toluene component. The aluminum dish is dried in a vacuum dryer (50° C., about 8 hours). The dried aluminum dish (the weight of toluene soluble matter+aluminum dish) is weighed, and the weight is recorded up to 0.1 mg order. The toluene insoluble matter is calculated by using the following formula.

$$\text{Toluene insoluble matter }\%=\{A-[(B-C)\times 8]\}/A\times 100$$

A: sample weight [g]

B: weight of toluene soluble matter+aluminum dish [g]

C: weight of only aluminum dish [g]

8: 40 divided by 5 (5 ml in 40 ml)

The toluene insoluble matter is controlled by, for example, adjusting the mixing ratio of the amorphous resin al having a weight average molecular weight of 8,000 or more and 28,000 or less (more preferably 10,000 or more and 25,000 or less) and the amorphous resin b1 having a weight average molecular weight of 300,000 or more and 1,100,000 or less (more preferably 350,000 or more and 900,000 or less) in the binder resin or adjusting the amount of crosslinker.

The volume average particle size (D50v) of the toner particles is preferably 2 μm or more and 10 μm or less, more preferably 4 μm or more and 8 μm or less.

The small-diameter-side number particle size distribution index (lower GSDp) of the toner particles is preferably 1.33 or less, more preferably 1.10 or more and 1.30 or less, still more preferably 1.15 or more and 1.25 or less in order to provide the toner with both good fixability and high resistance to thermal aggregation.

The large-diameter-side number particle size distribution index (upper GSDv) of the toner particles may be 1.30 or less, 1.05 or more and 1.25 or less, or 1.10 or more and 1.20 or less.

A method for controlling the lower GSDp and the upper GSDv of the toner particles in the above ranges is not limited, but the lower GSDp and the upper GSDv may be controlled by, for example, removing fine powder and coarse powder in the classifying step after grinding when the toner is produced by a kneading-grinding method.

Various average particle sizes and various particle size distribution indexes of the toner particles are measured by using Coulter Multisizer II (available from Beckman Coulter, Inc.) and electrolyte ISOTON-II (available from Beckman Coulter, Inc).

Before measurement, 0.5 mg or more and 50 mg or less of a test sample is added to 2 ml of a 5 mass % aqueous solution of a surfactant (e.g., sodium alkylbenzene sulfonate) serving as a dispersant. The resulting mixture is added to 100 ml or more and 150 ml or less of the electrolyte.

The electrolyte in which the sample is suspended is subjected to a dispersion treatment using an ultrasonic disperser for 1 minute, and the particle size distribution of particles having a particle size in the range of 2 μm or more and 60 μm or less is measured by using Coulter Multisizer II with an aperture having a diameter of 100 μm. The number of sampled particles is 50,000.

The volume-based cumulative distribution is drawn from the smallest particle size for particle size ranges (channels) divided on the basis of the measured particle size distribution, and the particle size at a cumulative percentage of 16% is defined as a volume particle size D16v, the particle size at a cumulative percentage of 50% as a volume average particle size D50v, and the particle size at a cumulative percentage of 84% as a volume particle size D84v. The number-based cumulative distribution is drawn from the smallest particle size, and the particle size at a cumulative percentage of 16% is defined as a number particle size D16p, the particle size at a cumulative percentage of 50% as a number average particle size D50p, and the particle size at a cumulative percentage of 84% as a number particle size D84p.

From these particle sizes, the large-diameter-side number particle size distribution index (upper GSDv) is calculated as (D84v/D50v), and the small-diameter-side number particle size distribution index (lower GSDp) as (D50p/D16p).

The average circularity of the toner particles is preferably 0.915 or more and 0.950 or less, more preferably 0.920 or more and 0.945 or less, and still more preferably 0.925 or more and 0.940 or less in order to provide the toner with both good fixability and high resistance to thermal aggregation.

A method for controlling the average circularity of the toner particles in the above range is not limited, but the average circularity may be controlled by, for example, treating the toner particles with hot air after classification when the toner is produced by a kneading-grinding method.

The average circularity of the toner particles is obtained from (the circle equivalent circumference)/(the circumference)[(the circumference of a circle having the same projected area as the particle image)/(the circumference of the projected particle image)]. Specifically, the average circularity of the toner particles is determined by the following method.

The toner particles to be analyzed are collected by suction to form a flat flow, and particle images are captured with stroboscopic flash as still images, and the particle images are analyzed with a flow particle image analyzer (FPIA-3000 available from Sysmex Corporation) to determine the average circularity. The number of particles sampled to determine the average circularity is 3,500.

When the toner has external additives, the toner (developer) to be analyzed is dispersed in surfactant-containing water, and the external additives are then removed by ultrasonication to form toner particles.

Structure of Toner Particles

The toner particles contain, for example, a binder resin. The toner particles may contain a colorant, a release agent, and other optional additives, and preferably contain a release agent in order to provide the toner with both good fixability and high resistance to thermal aggregation.

Binder Resin

The binder resin contains 90 mass % or more of amorphous resin relative to the entire binder resin, preferably contains 95 mass % or more and 100 mass % or less of amorphous resin, and more preferably contains 98 mass % or more and 100 mass % or less of amorphous resin in order to provide the toner with both good fixability and high resistance to thermal aggregation.

As described above, in the differential molecular weight distribution curve of the tetrahydrofuran soluble matter as measured by gel permeation chromatography, the maximum peak Ma in a molecular weight range of 2,500 or more and 8,000 or less and the maximum peak Mb in a molecular weight range of 280,000 or more and 900,000 or less are each from the binder resin, and preferably from an amorphous resin.

The term amorphous resin as used herein refers to a resin that shows only stepwise endothermic changes rather than having a distinct endothermic peak as measured by thermal analysis using differential scanning calorimetry (DSC) and that is solid at normal temperature and thermally plasticized at a temperature higher than or equal to the glass transition temperature.

The term crystalline resin refers to a resin that has a distinct endothermic peak rather than showing stepwise endothermic changes as measured by differential scanning calorimetry (DSC).

Specifically, for example, a crystalline resin means that the full width at half maximum of the endothermic peak measured at a heating rate of 10° C./min is within 10° C., and an amorphous resin means that a resin having a full width at half maximum of more than 10° C. or a resin showing no distinct endothermic peak.

The amorphous resin will be described.

Examples of the amorphous resin include known amorphous resins, such as amorphous polyester resins, amorphous vinyl resins (i.e., styrene acrylic resin), epoxy resins, polycarbonate resins, and polyurethane resins. Of these resins, amorphous polyester resins and amorphous vinyl resins (particularly, styrene acrylic resin) are preferred, and amorphous polyester resins are more preferred.

In some embodiments, the amorphous resin may be a combination of an amorphous polyester resin and a styrene acrylic resin. In some embodiments, the amorphous resin may have an amorphous polyester resin segment and a styrene acrylic resin segment.

Amorphous Polyester Resin

Examples of the amorphous polyester resin include a polycondensation polymer of a polycarboxylic acid and a polyhydric alcohol. An amorphous polyester resin may be a commercial product or a synthetic product.

Examples of the polycarboxylic acid include aliphatic dicarboxylic acids (e.g., oxalic acid, malonic acid, maleic acid, fumaric acid, citraconic acid, itaconic acid, glutaconic acid, succinic acid, alkenyl succinic acid, adipic acid, and sebacic acid), alicyclic dicarboxylic acids (e.g., cyclohexanedicarboxylic acid), aromatic dicarboxylic acids (e.g., terephthalic acid, isophthalic acid, phthalic acid, naphthalene dicarboxylic acid), anhydrides thereof, and lower (e.g., C1 to C5) alkyl esters thereof. Of these, the polycarboxylic acid may be an aromatic dicarboxylic acid.

The polycarboxylic acid may be a combination of a dicarboxylic acid and a trivalent or higher valent carboxylic acid having a crosslinked structure or branched structure. Examples of the trivalent or higher valent carboxylic acid include trimellitic acid, pyromellitic acid, anhydrides thereof, and lower (e.g., C1 to C5) alkyl esters thereof.

The polycarboxylic acid may be used alone or in combination of two or more.

Examples of the polyhydric alcohol include aliphatic diols (e.g., ethylene glycol, diethylene glycol, triethylene glycol, propylene glycol, butanediol, hexanediol, and neopentyl glycol), alicyclic diols (e.g., cyclohexanediol, cyclohexane dimethanol, hydrogenated bisphenol A), and aromatic diols (e.g., an ethylene oxide adduct of bisphenol A, and a propylene oxide adduct of bisphenol A). Of these, the polyhydric alcohol is preferably an aromatic diol or an alicyclic diol, more preferably an aromatic diol.

The polyhydric alcohol may be a combination of a diol and a trihydric or higher polyhydric alcohol having a crosslinked structure or branched structure. Examples of the trihydric or higher polyhydric alcohol include glycerol, trimethylolpropane, and pentaerythritol.

The polyhydric alcohol may be used alone or in combination of two or more.

The amorphous polyester resin is produced by using a known production method. Specifically, the amorphous polyester resin is produced by using, for example, causing reaction at a polymerization temperature of 180° C. or higher and 230° C. or lower in a reaction system under vacuum as needed while removing water and an alcohol generated during condensation. If the monomers serving as materials are neither dissolved in nor compatible with each other at the reaction temperature, the monomers may be dissolved by adding a solvent with a high boiling point as a solubilizer. In this case, the polycondensation reaction is carried out while the solubilizer is distilled off. If a monomer with poor compatibility is present in the copolymerization reaction, the monomer with poor compatibility is previously subjected to condensation with an acid or alcohol that is to undergo polycondensation with the monomer, and the resulting condensate is then subjected to polycondensation with a main component.

Examples of the amorphous polyester resin include modified amorphous polyester resins in addition to unmodified amorphous polyester resins. A modified amorphous polyester resin is an amorphous polyester resin having a bonding group other than an ester bond, or an amorphous polyester resin to which a resin component different from polyester is bonded through a covalent bond, an ionic bond, or the like. Examples of the modified amorphous polyester resin include a resin produced by causing an amorphous polyester resin having a functional group, such as an isocyanate group, at its terminal to react with an active hydrogen compound so as to modify the terminal of the amorphous polyester resin.

The proportion of the amorphous polyester resin in the entire binder resin is preferably 60 mass % or more and 98 mass % or less, more preferably 65 mass % or more and 95 mass % or less, still more preferably 70 mass % or more and 90 mass % or less.

Styrene Acrylic Resin

The styrene acrylic resin is a copolymer produced by copolymerizing at least a styrenic monomer (a monomer having a styrene skeleton) and a (meth)acrylic monomer (a monomer having a (meth)acrylic group, preferably a monomer having a (meth)acryloxy group). Examples of the styrene acrylic resin include copolymers of styrenic monomers and (meth)acrylic acid ester monomers.

The acrylic resin portion of the styrene acrylic resin is a partial structure formed by polymerizing either an acrylic monomer or a methacrylic monomer or both of them. The expression "(meth)acrylic" includes both "acrylic" and "methacrylic."

Examples of the styrenic monomer include styrene, α-methylstyrene, meta-chlorostyrene, para-chlorostyrene, para-fluorostyrene, para-methoxystyrene, meta-tert-butoxystyrene, para-tert-butoxystyrene, para-vinylbenzoic acid, and para-methyl-α-methylstyrene. The styrenic monomer may be used alone or in combination of two or more.

Examples of the (meth)acrylic monomer include (meth) acrylic acid, methyl (meth)acrylate, ethyl (meth)acrylate, propyl (meth)acrylate, isopropyl (meth)acrylate, n-butyl (meth)acrylate, isobutyl (meth) acrylate, n-hexyl (meth) acrylate, 2-ethylhexyl (meth)acrylate, lauryl (meth)acrylate, stearyl (meth)acrylate, cyclohexyl (meth)acrylate, dicyclopentanyl (meth)acrylate, isobornyl (meth)acrylate, 2-hydroxyethyl (meth)acrylate, hydroxypropyl (meth)acrylate, and 4-hydroxybutyl (meth)acrylate. The (meth)acrylic monomer may be used alone or in combination of two or more.

The polymerization ratio of the styrenic monomer to the (meth)acrylic monomer may be 70:30 to 95:5 (styrenic monomer:(meth)acrylic monomer) on a mass basis.

The styrene acrylic resin may have a crosslinked structure. The styrene acrylic resin having a crosslinked structure can be produced by, for example, copolymerizing a styrenic monomer, a (meth)acrylic monomer, and a crosslinkable monomer. Examples of the crosslikable monomer include, but are not limited to, bi- or higher functional (meth)acrylate compounds.

Examples of the method for producing the styrene acrylic resin include, but are not limited to, solution polymerization, precipitation polymerization, suspension polymerization, bulk polymerization, and emulsion polymerization. The polymerization reaction is carried out by using a known process (e.g., a batch process, a semi-continuous process, or a continuous process).

The proportion of the styrene acrylic resin in the entire binder resin is preferably 0 mass % or more and 20 mass % or less, more preferably 1 mass % or more and 15 mass % or less, still more preferably 2 mass % or more and 10 mass % or less.

Amorphous Resin Having Amorphous Polyester Resin Segment and Styrene Acrylic Resin Segment (Hereinafter Also Referred to as "Hybrid Amorphous Resin")

A hybrid amorphous resin is an amorphous resin in which an amorphous polyester resin segment is chemically bonded to a styrene acrylic resin segment.

Examples of the hybrid amorphous resin include a resin having a main chain composed of a polyester resin and a side chain composed of a styrene acrylic resin chemically bonded to the main chain; a resin having a main chain composed of a styrene acrylic resin and a side chain composed of a polyester resin chemically bonded to the main chain; a resin having a main chain formed by chemically bonding a polyester resin to a styrene acrylic resin; and a resin having a main chain formed by chemically bonding a polyester resin to a styrene acrylic resin and at least one of a side chain composed of a polyester resin chemically bonded to the main chain and a side chain composed of a styrene acrylic resin chemically bonded to the main chain.

The amorphous polyester resin and the styrene acrylic resin in the segments are as described above and will not be described.

The amorphous resin may contain at least one of an amorphous polyester resin and an amorphous resin having a polyester resin segment and a styrene acrylic resin segment.

The total amount of the polyester resin segment and the styrene acrylic resin segment relative to the entire hybrid amorphous resin is preferably 80 mass % or more, more preferably 90 mass % or more, still more preferably 95 mass % or more, yet still more preferably 100 mass %.

In the hybrid amorphous resin, the proportion of the styrene acrylic resin segment relative to the total amount of the polyester resin segment and the styrene acrylic resin segment is preferably 20 mass % or more and 60 mass % or less, more preferably 25 mass % or more and 55 mass % or less, still more preferably 30 mass % or more and 50 mass % or less.

The hybrid amorphous resin may be produced by any one of the following methods (i) to (iii).

(i) A polyester resin segment is formed by condensation polymerization of a polyhydric alcohol and a polycarboxylic acid, followed by addition polymerization of a monomer for forming a styrene acrylic resin segment.

(ii) A styrene acrylic resin segment is formed by addition polymerization of an addition polymerizable monomer, followed by condensation polymerization of a polyhydric alcohol and a polycarboxylic acid.

(iii) Condensation polymerization of a polyhydric alcohol and a polycarboxylic acid is performed in parallel with addition polymerization of an addition polymerizable monomer.

The proportion of the hybrid amorphous resin in the entire binder resin is preferably 60 mass % or more and 98 mass % or less, more preferably 65 mass % or more and 95 mass % or less, still more preferably 70 mass % or more and 90 mass % or less.

The properties of the amorphous resin will be described.

The glass transition temperature (Tg) of the amorphous resin is preferably 30° C. or higher and 90° C. or lower, more preferably 35° C. or higher and 85° C. or lower, still more preferably 40° C. or higher and 80° C. or lower in order to provide the toner with both good fixability and high resistance to thermal aggregation.

A specific method for controlling the glass transition temperature Tg of the amorphous resin in the above range is not limited, but the glass transition temperature Tg of the amorphous resin may be controlled by, for example, adjusting the reaction rate in the synthesis of the amorphous resin or adjusting the amount of crosslinker.

The glass transition temperature is determined from the DSC curve obtained by differential scanning calorimetry (DSC) and, more specifically, determined in accordance with "extrapolated glass transition onset temperature" described in the method for determining the glass transition temperature in JIS K 7121-1987 "Testing Methods for Transition Temperatures of Plastics".

For example, when two or more amorphous resins are contained, the glass transition temperature Tg of the amorphous resin described above refers to the lowest glass transition temperature among two or more observed glass transition temperatures.

The softening temperature of the amorphous resin is preferably 50° C. or higher and 200° C. or lower, more preferably 55° C. or higher and 180° C. or lower, still more preferably 60° C. or higher and 165° C. or lower.

The softening temperature can be determined in the following manner.

Using a flow tester "CFT-500D" (available from Shimadzu Corporation), 1 g of a sample is heated at a heating rate of 6° C./min and extruded from a nozzle with a diameter of 1 mm and a length of 1 mm under a load of 1.96 MPa applied with a plunger. The amount of descent of the plunger in the flow tester is plotted against temperature, and the temperature at which a half of the sample has flowed out is defined as a softening temperature.

The binder resin according to this exemplary embodiment may include less than 10 mass % of a crystalline resin relative to the entire binder resin.

The crystalline resin will be described.

Examples of the crystalline resin include known crystalline resins, such as crystalline polyester resins, and crystalline vinyl resins (i.e., polyalkylene resins, long-chain alkyl (meth)acrylate resins). Of these resins, crystalline polyester resins may be used in order to improve the mechanical strength and low-temperature fixability of the toner.

Crystalline Polyester Resin

Examples of the crystalline polyester resin include a polycondensate of a polycarboxylic acid and a polyhydric alcohol. The crystalline polyester resin may be a commercial product or a synthetic product.

The crystalline polyester resin may be a polycondensate produced by using a straight-chain aliphatic polymerizable monomer rather than a polymerizable monomer having an aromatic ring in order to easily form a crystal structure.

Examples of the polycarboxylic acid include aliphatic dicarboxylic acids (e.g., oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (e.g., dibasic acids, such as phthalic acid, isophthalic acid, terephthalic acid, and naphthalene-2,6-dicarboxylic acid), anhydrides thereof, and lower (e.g., C1 to C5) alkyl esters thereof.

The polycarboxylic acid may be a combination of a dicarboxylic acid and a trivalent or higher valent carboxylic acid having a crosslinked structure or branched structure. Examples of the trivalent carboxylic acid include aromatic carboxylic acids (e.g., 1,2,3-benzenetricarboxylic acid, 1,2,4-benzenetricarboxylic acid, and 1,2,4-naphthalenetricarboxylic acid), anhydrides thereof, and lower (e.g., C1 to C5) alkyl esters thereof.

The polycarboxylic acid may be a combination of these dicarboxylic acids and a dicarboxylic acid having a sulfonic acid group or a dicarboxylic acid having an ethylenic double bond.

The polycarboxylic acid may be used alone or in combination of two or more.

Examples of the polyhydric alcohol include aliphatic diols (e.g., straight-chain aliphatic diols having 7 to 20 carbon atoms in the main chain). Examples of aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosandecanediol. Among these, aliphatic diols are preferably 1,8-octanediol, 1,9-nonanediol, and 1,10-decanediol.

The polyhydric alcohol may be a combination of a diol and a trihydric or higher polyhydric alcohol having a cross-linked structure or branched structure. Examples of the trihydric or higher polyhydric alcohol include glycerol, trimethylolethane, trimethylolpropane, and pentaerythritol.

The polyhydric alcohol may be used alone or in combination of two or more.

The polyhydric alcohol preferably includes 80 mol % or more of an aliphatic diol and more preferably includes 90 mol % or more of an aliphatic diol.

The crystalline polyester resin is produced by, for example, a known production method, like the amorphous polyester resin.

The crystalline polyester resin may be a polymer of an α,ω-straight chain aliphatic dicarboxylic acid and an α,ω-straight chain aliphatic diol.

The α,ω-straight chain aliphatic dicarboxylic acid is preferably an α,ω-straight chain aliphatic dicarboxylic acid in which the number of carbon atoms in the alkylene group connecting two carboxy groups is 3 or more and 14 or less. The number of carbon atoms in the alkylene group is more preferably 4 or more and 12 or less, and the number of carbon atoms in the alkylene group is still more preferably 6 or more and 10 or less.

Examples of the α,ω-straight chain aliphatic dicarboxylic acid include succinic acid, glutaric acid, adipic acid, 1,6-hexanedicarboxylic acid (common name: suberic acid), 1,7-heptanedicarboxylic acid (common name: azelaic acid), 1,8-octadecanedicarboxylic acid (common name: sebacic acid), 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid. Of these, 1,6-hexanedicarboxylic acid, 1,7-heptanedicarboxylic acid, 1,8-octanedicarboxylic acid, 1,9-nonanedicarboxylic acid, and 1,10-decanedicarboxylic acid are preferred.

The α,ω-straight chain aliphatic dicarboxylic acid may be used alone or in combination of two or more.

The α,ω-straight chain aliphatic diol is preferably an α,ω-straight chain aliphatic diol in which the number of carbon atoms in the alkylene group connecting two hydroxy groups is 3 or more and 14 or less. The number of carbon atoms in the alkylene group is more preferably 4 or more and 12 or less, and the number of carbon atoms in the alkylene group is still more preferably 6 or more and 10 or less.

Examples of the α,ω-straight chain aliphatic diol include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 1,14-tetradecanediol, and 1,18-octadecanediol. Of these, 1,6-hexanediol, 1,7-heptanediol, 1,8-octanediol, 1,9-nonanediol, and 1,10-decanediol are preferred.

The α,ω-straight chain aliphatic diol may be used alone or in combination of two or more.

The polymer of an α,ω-straight chain aliphatic dicarboxylic acid and an α,ω-straight chain aliphatic diol is preferably a polymer of at least one selected from the group consisting of 1,6-hexanedicarboxylic acid, 1,7-heptanedicarboxylic acid, 1,8-octanedicarboxylic acid, 1,9-nonanedicarboxylic acid, and 1,10-decanedicarboxylic acid and at least one selected from the group consisting of 1,6-hexanediol, 1,7-heptanediol, 1,8-octanediol, 1,9-nonanediol, and 1,10-decanediol, more preferably a polymer of 1,10-decanedicarboxylic acid and 1,6-hexanediol.

The amount of the binder resin relative to the total mass of the toner particles is preferably 40 mass % or more and 95 mass % or less, more preferably 50 mass % or more and 90 mass % or less, still more preferably 60 mass % or more and 85 mass % or less.

Colorant

Examples of the colorant include pigments, such as carbon black, chrome yellow, hansa yellow, benzidine yellow, threne yellow, quinoline yellow, pigment yellow, permanent orange GTR, pyrazolone orange, vulcan orange, watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, calco oil blue, methylene blue chloride, phthalocyanine blue, pigment blue, phthalocyanine green, malachite green oxalate; and dyes, such as acridine dyes, xanthene dyes, azo dyes, benzoquinone dyes, azine dyes, anthraquinone dyes, thioindigo dyes, dioxazine dyes, thiazine dyes, azomethine dyes, indigo dyes, phthalocyanine dyes, aniline black dyes, polymethine dyes, triphenylmethane dyes, diphenylmethane dyes, and thiazole dyes.

The colorant may be used alone or in combination of two or more.

The colorant may be surface-treated as needed, or may be used in combination with a dispersant. Two or more colorants may be used in combination.

The amount of the colorant relative to the total mass of the toner particles is preferably 1 mass % or more and 30 mass % or less, more preferably 3 mass % or more and 15 mass % or less.

Release Agent

Examples of the release agent include hydrocarbon waxes; natural waxes, such as carnauba wax, rice wax, and candelilla wax; synthetic or mineral and petroleum waxes, such as montan wax; and ester waxes, such as waxes of fatty acid esters and montanic acid esters. The release agent is not limited to these, but ester wax may be contained in order to provide the toner with both good fixability and high resistance to thermal aggregation.

Melting Temperature of Release Agent

The melting temperature Tm of the release agent is preferably 50° C. or higher and 110° C. or lower, more preferably 55° C. or higher and 80° C. or lower, still more preferably 57° C. or higher and 68° C. or lower in order to provide the toner with both good fixability and high resistance to thermal aggregation.

The melting temperature Tm of the release agent is determined from the DSC curve obtained by differential scanning calorimetry (DSC) in accordance with "melting peak temperature" described in the method for determining the melting temperature in JIS K 7121:1987 "Testing Methods for Transition Temperatures of Plastics".

A difference (Tm−Tg) between the melting temperature Tm of the release agent and the glass transition temperature Tg of the amorphous resin is preferably 0° C. or more and 20° C. or less, more preferably 0° C. or more and 15° C. or less, still more preferably 0° C. or more and 10° C. or less in order to provide the toner with both good fixability and high resistance to thermal aggregation.

The amount of the release agent relative to the total mass of the toner particles is preferably 0.1 mass % or more and 15 mass % or less, more preferably 0.2 mass % or more and 10 mass % or less, still more preferably 0.5 mass % or more and 4 mass % or less in order to provide the toner with both good fixability and high resistance to thermal aggregation.

Other Additives

Examples of other additives include known additives, such as magnetic substances, charge control agents, and inorganic powders. These additives are internal additives contained in the toner particles.

External Additives

Examples of external additives include inorganic particles. Examples of the inorganic particles include $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $Cao \cdot SO_2$, $K_2O \cdot (TiO_2)_n$, $Al_2O_3 \cdot 2SiO_2$, $CaCO_3$, $MgCO_3$, $BaSO_4$, and $MgSO_4$.

The surfaces of the inorganic particles serving as an external additive may be hydrophobized. Hydrophobization is performed by, for example, dipping the inorganic particles in a hydrophobizing agent. Examples of the hydrophobizing agent include, but are not limited to, a silane coupling agent, a silicone oil, a titanate coupling agent, and an aluminum coupling agent. These hydrophobizing agents may be used alone or in combination of two or more. The amount of the hydrophobizing agent is normally, for example, 1 part by mass or more and 10 parts by mass or less relative to 100 parts by mass of the inorganic particles.

Examples of external additives also include resin particles (resin particles made of, for example, polystyrene, polymethyl methacrylate, and melamine resin), and cleaning active agents (e.g., higher fatty acid metal salts, such as zinc stearate, and fluoropolymer particles).

The amount of external additives externally added is preferably 0.01 mass % or more and 5 mass % or less, more preferably 0.01 mass % or more and 2.0 mass % or less relative to the toner particles.

Method for Producing Toner

The toner according to this exemplary embodiment is obtained by externally adding external additives to toner particles after producing the toner particles.

The toner particles may be produced by using any one of dry production methods (e.g., a kneading-grinding method) and wet production methods (e.g., an aggregation-coalescence method, a suspension-polymerization method, and a dissolution-suspension method). There is no limitation on these production methods, and a known production method is employed.

Of the production methods described above, a kneading-grinding method may be used as a method for producing the toner according to this exemplary embodiment since binder resins tend to be compatible with each other at the molecular level in the kneading-grinding method, and thus the toner particles are each easily uniformly provided with thermal properties and easily formed to have irregular shapes which may improve resistance to thermal aggregation.

An example method for producing toner particles by using a kneading-grinding method will be described below.

The kneading-grinding method is a method for producing toner particles by, for example, melt-kneading a colorant and a binder resin including an amorphous resin and a crystalline resin, followed by grinding and classification. In the kneading-grinding method, for example, toner particles are produced through a kneading step of melt-kneading components including a binder resin and a colorant, a cooling step of cooling the melt-kneaded material, a grinding step of grinding the kneaded material after cooling, and a classifying step of classifying the ground material.

The details of each step in the kneading-grinding method will be described below.

Kneading Step

The kneading step involves melt-kneading components including an oligomer and a binder resin including an amorphous resin and a crystalline resin to form a kneaded material.

Examples of kneaders used in the kneading step include three-roll-type, single screw-type, double screw-type, and Banbury mixer-type kneaders.

The melting temperature is determined according to, for example, the type and mixing ratio of binder resin and oligomer to be kneaded.

Cooling Step

The cooling step involves cooling the kneaded material formed in the kneading step.

In the cooling step, for example, the kneaded material is cooled to 40° C. or lower at an average cooling rate of 15° C./sec or less from the temperature of the kneaded material at the end of the kneading step. The domain of the crystalline resin in the kneaded material easily grows accordingly.

The average cooling rate refers to an average rate at which the kneaded material is cooled to 40° C. from the temperature of the kneaded material at the end of the kneading step.

Examples of the cooling method in the cooling step include methods using rolling-mill rolls in which cold water or brine circulates, a sandwich-type cooling belt, and the like. In cooling using the method described above, the cooling rate is determined according to the speed of the rolling-mill rolls, the flow rate of brine, the feed rate of the kneaded material, the slab thickness at the time of rolling the kneaded material, and the like.

Grinding Step

The kneaded material cooled in the cooling step is ground in the grinding step to form particles.

The grinding step uses, for example, a mechanical mill or a jet mill.

Before grinding, the kneaded material may be heated to about a temperature below the melting point of the crystalline resin (e.g., below the melting temperature of the crystalline resin (melting temperature−15° C.)). The domain of the crystalline resin in the kneaded material easily grows accordingly.

Classifying Step

The ground material (particles) produced in the grinding step may be classified in the classifying step as needed in order to produce toner particles having an intended average particle size.

In the classifying step, fine powder (particles smaller than the intended particle size range) and coarse powder (particles larger than the intended particle size range) are removed by using a centrifugal classifier, an inertial classifier, or the like, which is used in the related art.

Hot Air Treatment Step

After the classifying step, hot air treatment may be performed in a hot air treatment step as needed in order to produce toner particles having an intended circularity.

The toner according to this exemplary embodiment is produced by, for example, adding external additives to the obtained dry toner particles and mixing them. Mixing may be performed with, for example, a V-blender, a Henschel mixer, or a Lodige mixer. In addition, coarse toner particles may be removed with a vibratory screening machine, an air screening machine, or other machines, as needed.

Electrostatic Charge Image Developer

An electrostatic charge image developer according to an exemplary embodiment contains at least the toner according to this exemplary embodiment.

The electrostatic charge image developer according to this exemplary embodiment may be a one-component developer containing only the toner according to this exemplary embodiment, or may be a two-component developer formed by mixing the toner and a carrier.

The carrier is not limited, and may be a known carrier. Examples of the carrier include a coated carrier obtained by coating, with a coating resin, the surface of a core made of magnetic powder; a magnetic powder-dispersed carrier in which magnetic powder is dispersed and mixed in a matrix resin; and a resin-impregnated carrier in which porous magnetic powder is impregnated with a resin.

The magnetic powder-dispersed carrier and the resin-impregnated carrier may be carriers in which particles constituting the carrier, which serve as cores, are coated with a coating resin.

Examples of the magnetic powder include powders made of magnetic metals, such as iron, nickel, and cobalt; and powders made of magnetic oxides, such as ferrite and magnetite.

Examples of the coating resin and the matrix resin include polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylic acid ester copolymer, a straight silicone resin including an organosiloxane bond and modified products thereof, fluorocarbon resin, polyester, polycarbonate, phenolic resin, and epoxy resin.

The coating resin and the matrix resin may contain other additives, such as conductive particles.

Examples of the conductive particles include particles made of metals, such as gold, silver, and copper; and particles made of carbon black, titanium oxide, zinc oxide, tin oxide, barium sulfate, aluminum borate, and potassium titanate.

The surface of the core is coated with resin by, for example, a coating method using a coating layer-forming solution in which a coating resin and various optional additives are dissolved in an appropriate solvent. The solvent is not limited and may be selected in consideration of the coating resin used, coating suitability, and the like.

Specific examples of the resin coating method include an immersion method that involves immersing the core in the coating layer-forming solution; a spray method that involves spraying the coating layer-forming solution onto the surface of the core; a fluidized bed method that involves spraying the coating layer-forming solution onto the core while floating the core in air flow; and a kneader-coater method that involves mixing the core of the carrier and the coating layer-forming solution in a kneader-coater, and then removing the solvent.

The mixing ratio (mass ratio) of the toner to the carrier in a two-component developer is preferably from 1:100 to 30:100 (=toner:carrier), and more preferably from 3:100 to 20:100.

Image Forming Apparatus/Image Forming Method

An image forming apparatus and an image forming method according to exemplary embodiments will be described.

An image forming apparatus according to an exemplary embodiment includes: an image holding member; a charging unit that charges the surface of the image holding member; an electrostatic charge image forming unit that forms an electrostatic charge image on the charged surface of the image holding member; a developing unit that stores an electrostatic charge image developer and develops an electrostatic charge image on the surface of the image holding member by using the electrostatic charge image developer to form a toner image; a transfer unit that transfers the toner image on the surface of the image holding member to the surface of a recording medium; and a fixing unit that fixes the toner image that has been transferred to the surface of the recording medium. The electrostatic charge image developer according to this exemplary embodiment is used as an electrostatic charge image developer.

An image forming method (an image forming method according to an exemplary embodiment) is carried out in the image forming apparatus according to this exemplary embodiment. The image forming method includes: a charging step of charging the surface of the image holding member; an electrostatic charge image forming step of forming an electrostatic charge image on the charged surface of the image holding member; a developing step of developing the electrostatic charge image on the surface of the image holding member by using the electrostatic charge image developer according to this exemplary embodiment to form a toner image; a transferring step of transferring the toner image on the surface of the image holding member to the surface of a recording medium; and a fixing step of fixing the toner image that has been transferred to the surface of the recording medium.

The image forming apparatus according to this exemplary embodiment may be a well-known image forming apparatus, such as a direct transfer-type apparatus in which a toner image formed on the surface of an image holding member is directly transferred to a recording medium; an intermediate transfer-type apparatus in which a toner image formed on the surface of an image holding member is first transferred to the surface of an intermediate transfer body, and the toner image, which has been transferred to the surface of the intermediate transfer medium, is second transferred to the surface of a recording medium; an apparatus including a cleaning unit that cleans the surface of an image holding member before charging after transfer of a toner image; and an apparatus including a discharging unit that discharges the surface of an image holding member by irradiating the surface of the image holding member with discharging light before charging after transfer of a toner image.

In an intermediate transfer-type apparatus, the transfer unit includes, for example, an intermediate transfer body having the surface to which a toner image is transferred, a first transfer unit that first transfers the toner image on the surface of the image holding member to the surface of the intermediate transfer body, and a second transfer unit that second transfers the toner image, which has been transferred to the surface of the intermediate transfer body, to the surface of a recording medium.

In the image forming apparatus according to this exemplary embodiment, for example, a section including the developing unit may be a cartridge structure (process cartridge) that is attachable to and detachable from the image forming apparatus. The process cartridge may be, for example, a process cartridge including a developing unit that stores the electrostatic charge image developer according to this exemplary embodiment.

An example of the image forming apparatus according to this exemplary embodiment will be described below, but the image forming apparatus is not limited to this example. The main parts shown in the figure will be described, and other parts will not be described.

FIG. 1 is a schematic structural view of the image forming apparatus according to this exemplary embodiment.

The image forming apparatus shown in FIG. 1 includes first to fourth electrophotographic image forming units 10Y, 10M, 10C, and 10K (image forming units), which respectively output yellow (Y), magenta (M), cyan (C), and black (K) color images based on color-separated image data. The image forming units (hereinafter may also be referred to simply as "units") 10Y, 10M, 10C, and 10K are arranged and spaced apart from each other at predetermined intervals in the horizontal direction. The units 10Y, 10M, 10C, and 10K may be process cartridges that are attachable to and detachable from the image forming apparatus.

An intermediate transfer belt 20, which is an intermediate transfer body, passes through the units 10Y, 10M, 10C, and 10K and extends to run above the units 10Y, 10M, 10C, and 10K in the figure. The intermediate transfer belt 20 is wound around a drive roll 22 and a support roll 24 and runs in the direction from the first unit 10Y to the fourth unit 10K. The drive roll 22 and the support roll 24 are spaced apart from each other in the horizontal direction in the figure, and the support roll 24 is in contact with the inner surface of the intermediate transfer belt 20. The support roll 24 experiences a force in a direction away from the drive roll 22 by means of a spring or the like (not shown), so that tension is applied to the intermediate transfer belt 20 wound around the support roll 24 and the drive roll 22. An intermediate transfer body cleaning device 30 is disposed on a surface of the intermediate transfer belt 20 adjacent to the image holding members so as to face the drive roll 22.

Toners including four color toners of yellow, magenta, cyan, and black respectively accommodated in toner cartridges 8Y, 8M, 8C, and 8K are supplied to developing devices (developing units) 4Y, 4M, 4C, and 4K of units 10Y, 10M, 10C, and 10K.

Since the first to fourth units 10Y, 10M, 10C, and 10K have the same structure, the first unit 10Y disposed upstream in the running direction of the intermediate transfer belt to form a yellow image will be described as a representative example. The same parts as in the first unit 10Y are assigned with reference signs with magenta (M), cyan (C), and black (K) instead of yellow (Y), and therefore the second to fourth units 10M, 10C, and 10K will not be described.

The first unit 10Y has a photoreceptor 1Y, which functions as an image holding member. The photoreceptor 1Y is surrounded by, in sequence, a charging roll (an example of the charging unit) 2Y, which charges the surface of the photoreceptor 1Y to a predetermined potential, an exposure device (an example of the electrostatic charge image forming unit) 3, which exposes the charged surface to a laser beam 3Y based on a color-separated image signal to form an electrostatic charge image, a developing device (an example of the developing unit) 4Y, which supplies charged toner to the electrostatic charge image to develop the electrostatic charge image, a first transfer roll 5Y (an example of the first transfer unit), which transfers the developed toner image to the intermediate transfer belt 20, and a photoreceptor cleaning device (an example of the cleaning unit) 6Y, which removes toner remaining on the surface of the photoreceptor 1Y after the first transfer.

The first transfer roll 5Y is disposed on the inner side of the intermediate transfer belt 20 so as to face the photoreceptor 1Y. In addition, the first transfer rolls 5Y, 5M, 5C, and 5K are connected to the respective bias power supplies (not shown) that apply a first transfer bias. The transfer bias applied by each bias power supply to the corresponding first transfer roll changes under the control of a controller (not shown).

The operation of the first unit 10Y in forming a yellow image will be described below.

Before operation, the charging roll 2Y charges the surface of the photoreceptor 1Y to a potential of −600 V to −800 V.

The photoreceptor 1Y includes a conductive substrate (e.g., a volume resistivity of $1\times10^{-6}$ Ωcm or less at 20° C.) and a photosensitive layer stacked on the substrate. The photosensitive layer normally has high resistance (resistance of common resin) but, upon irradiation with the laser beam 3Y, changes its specific electrical resistance in a laser beam-irradiated region. For this, the charged surface of the photoreceptor 1Y is exposed to the laser beam 3Y through the exposure device 3 in accordance with yellow image data sent from the controller (not shown). The photosensitive layer on the surface of the photoreceptor 1Y is irradiated with the laser beam 3Y to form an electrostatic charge image with a yellow image pattern on the surface of the photoreceptor 1Y.

The electrostatic charge image is formed on the surface of the photoreceptor 1Y by charging. The electrostatic charge image is so-called a negative latent image formed when the laser beam 3Y reduces the specific resistance of the irradiated portion of the photosensitive layer to neutralize the charge on the surface of the photoreceptor 1Y while the charge on a portion not irradiated with the laser beam 3Y remains.

The electrostatic charge image formed on the photoreceptor 1Y rotates to a predetermined developing position as the photoreceptor 1Y runs. At this developing position, the electrostatic charge image on the photoreceptor 1Y is visualized (developed) by the developing device 4Y to form a toner image.

The developing device 4Y stores, for example, an electrostatic charge image developer containing at least a yellow toner and a carrier. The yellow toner is triboelectrically charged by stirring inside the developing device 4Y so as to have a charge with the same polarity (negative polarity) as the charge on the photoreceptor 1Y and held on a developer roll (an example of a developer holding member). As the surface of the photoreceptor 1Y passes through the developing device 4Y, the yellow toner electrostatically adheres to discharged latent image areas on the surface of the photoreceptor 1Y, whereby the latent image is developed by the yellow toner. The photoreceptor 1Y having the yellow toner image formed thereon subsequently runs at a predetermined speed, and the toner image developed on the photoreceptor 1Y is transported to a predetermined first transfer position.

When the yellow toner image on the photoreceptor 1Y is transported to the first transfer, a first transfer bias is applied to the first transfer roll 5Y so that an electrostatic force from the photoreceptor 1Y toward the first transfer roll 5Y acts on the toner image, transferring the toner image on the photoreceptor 1Y to the intermediate transfer belt 20. The transfer bias applied at this time has polarity (+) opposite to the polarity (−) of the toner and is controlled at, for example, +10 μA in the first unit 10Y by the controller (not shown).

The toner remaining on the photoreceptor 1Y is removed and collected by the photoreceptor cleaning device 6Y.

The first transfer biases applied to the first transfer rolls 5M, 5C, and 5K in the second unit 10M and the subsequent units are also controlled in accordance with the first unit.

Accordingly, the intermediate transfer belt 20 to which the yellow toner image has been transferred in the first unit 10Y is transported through the second to fourth units 10M, 10C, and 10K, and the toner images of respective colors are multiply transferred in a superimposed manner.

The intermediate transfer belt 20 to which the four color toner images have been multiply transferred through the first to fourth units reaches a second transfer section including the intermediate transfer belt 20, the support roll 24 in contact with the inner surface of the intermediate transfer belt, and a second transfer roll (an example of the second transfer unit) 26 disposed adjacent to the image holding surface of the intermediate transfer belt 20. A sheet of recording paper (an example of the recording medium) P is fed to a gap between the second transfer roll 26 and the intermediate transfer belt 20 through a feeding mechanism at a predetermined timing, and a second transfer bias is applied to the support roll 24. The transfer bias applied at this time has the same polarity (−) as the polarity (−) of the toner, and an electrostatic force from the intermediate transfer belt 20 toward the sheet of recording paper P acts on the toner image, transferring the toner image on the intermediate transfer belt 20 to the sheet of recording paper P. The second transfer bias in this case is determined on the basis of the resistance detected by a resistance detector (not shown) that detects the resistance of the second transfer section, and the voltage of the second transfer bias is controlled.

The sheet of recording paper P is then conveyed to a pressure contact part (nip part) between a pair of fixing rolls in a fixing device (an example of the fixing unit) 28, and the toner image is thus fixed to the sheet of recording paper P to form a fixed image.

Examples of the recording paper P to which a toner image is transferred include plain paper used in electrophotographic copiers, printers, and the like. Examples of the recording medium include OHP sheets, in addition to the recording paper P.

To further improve the smoothness of the image surface after fixing, the recording paper P may have a smooth surface and may be, for example, coated paper obtained by coating the surface of plain paper with resin or the like, art paper for printing, or the like.

The sheet of recording paper P to which the color image has been fixed is discharged to a discharge section, whereby a series of color image forming operations are completed.

Process Cartridge/Toner Cartridge

A process cartridge according to an exemplary embodiment will be described.

A process cartridge according to an exemplary embodiment is a process cartridge attachable to and detachable from an image forming apparatus and includes a developing unit that stores the electrostatic charge image developer according to this exemplary embodiment and that develops an electrostatic charge image on the surface of an image holding member by using the electrostatic charge image developer to form a toner image.

The process cartridge according to this exemplary embodiment is not limited to the foregoing structure and may include a developing device and as needed, at least one selected from, for example, an image holding member, a charging unit, an electrostatic charge image forming unit, a transfer unit, and other units.

An example of the process cartridge according to this exemplary embodiment will be described below, but the process cartridge is not limited to this example. The main parts shown in the figure will be described, and other parts will not be described.

Figure 2:
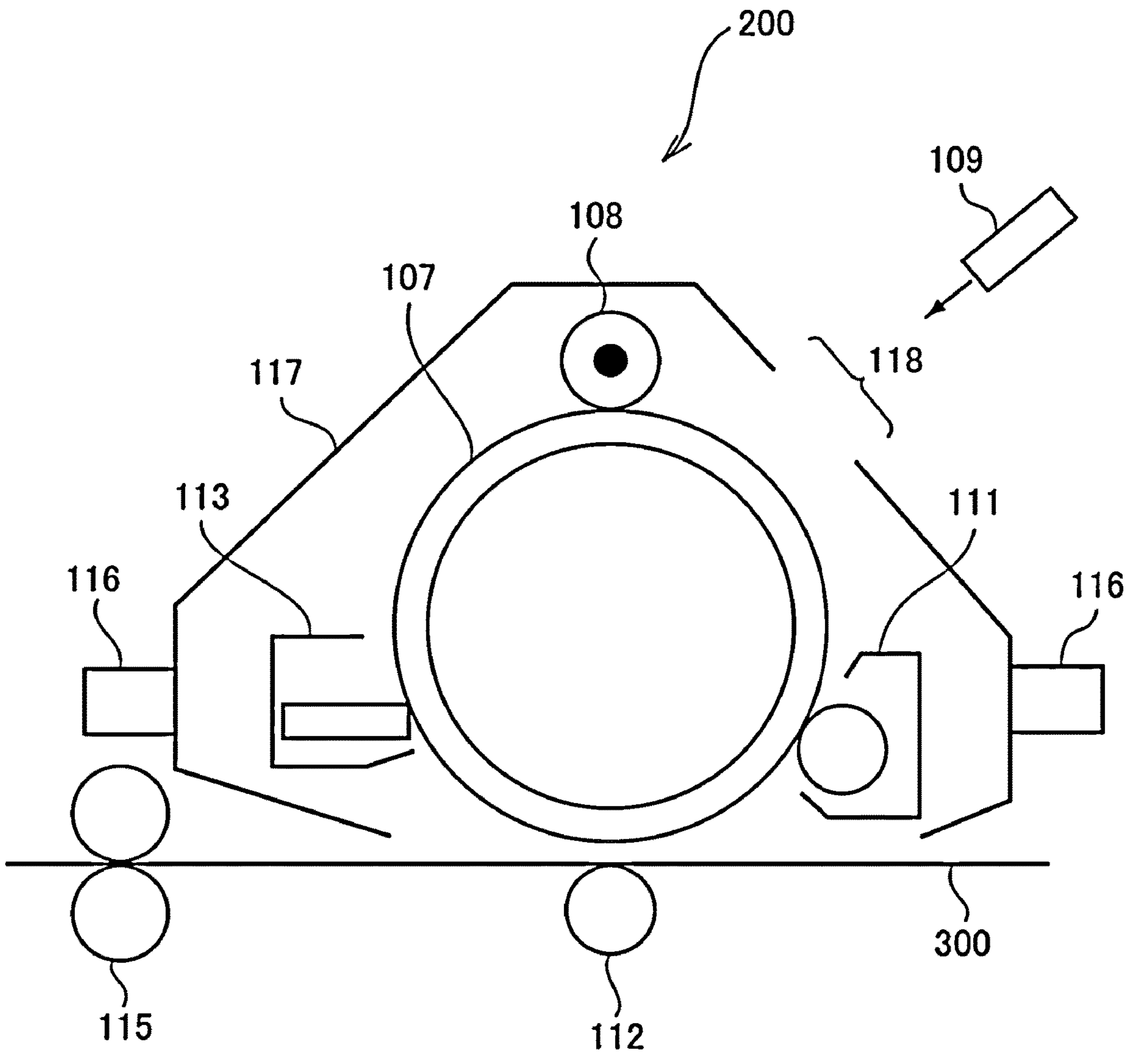
FIG. 2 is a schematic structural view of an example of a process cartridge attachable to and detachable from the image forming apparatus according to this exemplary embodiment.

FIG. 2 is a schematic structural view of the process cartridge according to this exemplary embodiment.

A process cartridge 200 shown in FIG. 2 is configured as a cartridge in such a manner that, for example, a photoreceptor 107 (an example of the image holding member) and, on the periphery of the photoreceptor 107, a charging roll 108 (an example of the charging unit), a developing device 111 (an example of the developing unit), and a photoreceptor cleaning device 113 (an example of the cleaning unit) are integrally combined and held together by a housing 117 including an installation rail 116 and an opening 118 for exposure.

In FIG. 2, the reference numeral 109 represents an exposure device (an example of the electrostatic charge image forming unit), the reference numeral 112 represents a transfer device (an example of the transfer unit), the reference numeral 115 represents a fixing device (an example of the fixing unit), and the reference numeral 300 represents a sheet of recording paper (an example of the recording medium).

Next, a toner cartridge according to an exemplary embodiment will be described.

The toner cartridge according to this exemplary embodiment stores the toner according to this exemplary embodiment and is attachable to and detachable from an image forming apparatus. The toner cartridge stores toner for replenishment to be supplied to the developing unit in the image forming apparatus.

The image forming apparatus shown in FIG. 1 has detachable toner cartridges 8Y, 8M, 8C, and 8K. The developing devices 4Y, 4M, 4C, and 4K are connected to the respective toner cartridges corresponding to the developing devices (colors) through toner feed tubes (not shown). When the toner stored in each toner cartridge runs short, the toner cartridge is replaced.

EXAMPLES

Exemplary embodiments of the present disclosure will be described below in detail by way of Examples, but exemplary embodiments of the present disclosure are not limited to these Examples. In the following description, the units "part" and "%" are on a mass basis, unless otherwise specified.

Synthesis of Polymer A

The materials shown in Table 1 and 40 parts of Tin(II) 2-ethylhexanoate are placed in the amounts shown in Table 1 in a 5-L-four-necked flask equipped with a nitrogen inlet tube, a dehydration tube, a stirrer, and a thermocouple and heated to 235° C. in a nitrogen atmosphere to cause reaction until the reaction rate reaches 60%. The reaction then proceeds at 8 kPa until the softening temperature shown in Table 1 is reached, and the reaction product is then cooled to room temperature to provide a polymer A, which is an amorphous resin. The weight average molecular weight, glass transition temperature, and softening temperature of the obtained polymer A are shown in Table 1. The reaction rate refers to the amount of generated reaction water/the theoretical amount of generated water×100.

Synthesis of Polymers B, C, G and H

Polymers B, C, G and H, which are amorphous resins, are produced by the same method as that for the polymer A except that the materials, the amount, and the reaction rate are as described in specifications in Table 1.

Synthesis of Polymer D

The materials except for trimellitic anhydride shown in Table 1 and 40 parts of Tin(II) 2-ethylhexanoate are placed in the amounts shown in Table 1 in a 5-L-four-necked flask equipped with a nitrogen inlet tube, a dehydration tube, a stirrer, and a thermocouple and heated to 235° C. in a nitrogen atmosphere to cause reaction until the reaction rate reaches 88%. The reaction then proceeds at 8 kPa for one hour. Subsequently, the reaction system is cooled to 210° C. and returned to normal pressure (101.3 kPa), and trimellitic anhydride is added to the reaction system to further cause reaction at 210° C. under normal pressure for one hour. The reaction then proceeds at 15 kPa until the softening temperature shown in Table 1 is reached, and the reaction product is then cooled to room temperature to provide a polymer D, which is an amorphous resin.

Synthesis of Polymers E, F, I, and J

Polymers E, F, I, and J, which are amorphous resins, are produced by the same method as that for the polymer D except that the materials, the amount, and the reaction rate are as described in specifications in Table 1.

Synthesis of Polymer K

In a reactor, 200 parts of toluene is placed and heated to reflux temperature. A mixture of 84 parts of styrene monomer, 16 parts of butyl acrylate, and 5 parts of di-tert-butyl peroxide is added dropwise to the reactor at 100° C. over 2 hours. After completion of the polymerization reaction under toluene reflux, the solvent toluene is removed to provide a polymer K, which is an amorphous resin. The obtained polymer K, an amorphous resin, has a softening temperature of 92° C., a glass transition temperature of 50° C., and a weight average molecular weight of 32,000.

Synthesis of Polymer L

In a reactor, 200 parts of degassed water is placed, and 75 parts of styrene monomer, 25 parts of 2-ethylhexyl acrylate, and 0.5 parts of 1.1'-azobiscyclohexanecarbonitrile are further added to form a suspension dispersion. The suspension dispersion is heated to 80° C. in a nitrogen atmosphere. This temperature is held for 24 hours to complete the polymerization reaction. After the reaction system is cooled to room temperature, the spherical polymer particles produced by the polymerization reaction are filtered out and washed well with water, and then dehydrated and dried to provide a polymer L. The obtained polymer L has a softening temperature of 155° C., a glass transition temperature of 72° C., and a weight average molecular weight of 956,000.

Synthesis of Polymer cA

In a heat-dried three-necked flask, 225 parts of 1,10-dodecanedioic acid, 174 parts of 1,10-decanediol, and 0.8 parts of catalyst dibutyltin oxide are placed. The air in the three-necked flask is then replaced with nitrogen by a vacuum operation so as to generate an inert atmosphere. The reaction is performed under reflux and mechanical stirring at 180° C. for 5 hours. During the reaction, water generated in the reaction system is distilled off. Subsequently, the reaction system is gradually heated to 230° C. and stirred for 2 hours under vacuum. When the mixture becomes viscous, the molecular weight is determined by GPC. When the weight average molecular weight reaches 17,500, vacuum distillation is terminated to provide a polymer cA. The obtained polymer cA has a melting temperature of 74° C.

Preparation of Binder Resins 1 to 10 and c1 and c6

A combination of 70 parts of a first polymer and 30 parts of a second polymer as shown in Table 2 is added to 200 parts of xylene, and the resulting mixture is stirred. The reactor is next heated to 60° C. to completely dissolve the added polymers. Subsequently, the reaction system is continuously stirred with heating at the same temperature for about 2 hours, and xylene is then removed to provide a binder resin in an example.

In Table 2, "-" indicates a binder resin free of a first polymer or a second polymer, that is, a binder resin containing one polymer component.

Preparation of Binder Resin 11

A binder resin 11 is prepared by the same operation as in Example 1 except that the materials in Example 1 are changed to 67.5 parts of a first polymer, 27.5 parts of a second polymer, and 5 parts of the polymer cA.

Preparation of Binder Resin c7

A binder resin c7 is prepared by the same operation as in Example 1 except that the materials in Example 1 are changed to 65 parts of a first polymer, 15 parts of a second polymer, and 20 parts of the polymer cA.

In Table 1, BPA-PO indicates a "propylene oxide adduct of bisphenol A (average number of moles added: 2.2 mol)", and BPA-EO indicates an "ethylene oxide adduct of bisphenol A (average number of moles added: 2.2 mol)".

Example 1

Binder resin 1: 81 parts

Carbon black (BPL, Cabot Corporation): 6 parts

Ester wax (WEP-9, NOF CORPORATION): 3 parts

A mixture of the above materials is melt-kneaded with a Banbury mixer for 5 minutes, then rolled/cooled, coarsely ground with a hammer mill, then finely ground with a jet mill, and classified with an air classifier to provide toner particles having a volume average particle size of 9.0 μm. The toner particles (100 parts by weight) are mixed with 1.0 parts by weight of titanium oxide and 0.3 parts by weight of hydrophobic silica by using a Henschel mixer to provide a toner 1.

Example 2 to Example 14, Comparative Example C1 to Comparative Example C7

Toners in examples are prepared by the same operation as in Example 1 except that the type, structure, and glass transition temperature of the binder resin, the type, amount, and melting temperature of the release agent, and the properties of the toner particles are as shown in specifications in Table 3 to Table 4.

The produced toners in examples are measured for the following properties according to the methods described above. The results are shown in Table 3 to Table 4.

- Maximum peak Ma in molecular weight range of 2,500 or more and 8,000 or less
- Minimum value Mm in molecular weight range of more than 8,000 and less than 280,000
- Maximum peak Mb in molecular weight range of 280,000 or more and 900,000 or less
- Area A of differential molecular weight distribution curve in range of molecular weight of 100 or more and less than minimum value Mm
- Area B of differential molecular weight distribution curve in range of minimum value Mm or more and molecular weight of 10,000,000 or less
- Area ratio A/B
- Full width at half maximum of maximum peak Ma
- Full width at half maximum of maximum peak Mb
- Ratio (Ha/Hb) of height Ha of maximum peak Ma to height Hb of maximum peak Mb Relationship (Mb−Mm)/(Mm−Ma) among maximum peak Ma, minimum value Mm, and maximum peak Mb Glass transition temperature Tg of binder resin Melting temperature of release agent Difference (Tm−Tg) between melting temperature Tm of release agent and glass transition temperature Tg of amorphous resin Average circularity of toner particles Small-diameter-side number particle size distribution index (lower GSDp) of toner particles Proportion of toluene insoluble matter in toner particles In Tables, "blank", "-", and "0" indicate that the corresponding material is not contained.

In Tables, the notation "none" in the item Ma indicates "no peak is observed in a molecular weight range of 2500 or more and 8000 or less".

In Tables, the notation "none" in the item Mm indicates "no minimum value is observed in a molecular weight range of more than 8,000 and less than 280,000".

In Tables, the notation "none" in the item Mb indicates "no peak is observed in a molecular weight range of 280,000 or more and 900,000 or less".

In Tables, the numerical values described in the items Ma and Mb in Comparative Examples indicate the values of peaks observed in the differential molecular weight distribution curve and include the values of peaks out of the molecular weight range of 2500 or more and 8000 or less or the range of the minimum value Mm or more and a molecular weight of 10,000,000 or less. In Tables, the numerical values described in the item Mm in Comparative Examples indicate, when two or more peaks are observed in the differential molecular weight distribution curve, the minimum value in a valley of the peaks.

TABLE 2-continued

| Binder resin | First polymer | Second polymer | Proportion of amorphous resin in binder resin (parts) |
|---|---|---|---|
| 10 | K | L | 100 |
| 11 | B | E | 95 |

Evaluation

Fixability: Evaluation of Image Intensity

Fourteen parts of toluene is added to 1.6 parts of methyl methacrylate-perfluorooctyl ethyl acrylate copolymer, and the mixture is dispersed with a sand mill to form a dispersion. Next, the dispersion and 100 parts of ferrite particles (volume average particle size: 50 μm) are placed in a vacuum degassing kneader and stirred at a temperature of 60° C. for 30 minutes, and toluene is then distilled off under vacuum to provide a resin-coated carrier. The copolymerization ratio of the methyl methacrylate-perfluorooctyl ethyl acrylate copolymer is 85:15.

In a V-blender, 36 parts of a toner in an example and 414 parts of the resin-coated carrier are placed, stirred for 20 minutes, and next sifted through a sieve with a mesh size of 212 μm to produce a developer in an example.

The developer in the example is left to stand in an environment at temperature 25° C./humidity 25% RH for 12 hours and then installed into a developing device in an image forming apparatus (modified 700 Digital Color Press available from Fuji Xerox Co., Ltd). The toner in the example is placed in a replenishment developer container. Subsequently, an image of Test Chart No. 4 published by the Imaging Society of Japan is formed on 100 sheets of printing paper (C2r paper available from Fuji Xerox Co., Ltd) in an environment at temperature 15° C./humidity 10% RH. The fixing temperature is 160° C.

TABLE 1

| | | | Polymer A | Polymer B | Polymer C | Polymer D | Polymer E | Polymer F | Polymer G | Polymer H | Polymer I | Polymer J |
|---|---|---|---|---|---|---|---|---|---|---|---|---|
| Charge amount | Alcohol | BPA-PO | 1350 | 1350 | 1350 | | | | 1350 | 1350 | | |
| | | BPA-EO | 4000 | 4000 | 4000 | 5250 | 5250 | 5250 | 4000 | 4000 | 5250 | 5250 |
| | Acid | Tetrapropenyl succinic anhydride | 900 | 900 | 900 | 820 | 820 | 820 | 900 | 900 | 820 | 820 |
| | | Terephthalic acid | 1700 | 1700 | 1700 | 1250 | 1250 | 1250 | 1700 | 1700 | 1250 | 1250 |
| | | Trimellitic anhydride | | | | 650 | 650 | 650 | | | 650 | 650 |
| Softening temperature (° C.) | | | 75 | 82 | 90 | 140 | 145 | 152 | 65 | 100 | 130 | 160 |
| Glass transition temperature (° C.) | | | 45 | 46 | 48 | 65 | 67 | 70 | 42 | 52 | 60 | 75 |

TABLE 2

| Binder resin | First polymer | Second polymer | Proportion of amorphous resin in binder resin (parts) |
|---|---|---|---|
| c1 | G | I | 100 |
| c2 | G | J | 100 |
| c3 | H | I | 100 |
| c4 | H | J | 100 |
| c5 | — | E | 100 |
| c6 | B | — | 100 |
| c7 | G | I | 80 |
| 1 | A | D | 100 |
| 2 | A | E | 100 |
| 3 | A | F | 100 |
| 4 | B | D | 100 |
| 5 | B | E | 100 |
| 6 | B | F | 100 |
| 7 | C | D | 100 |
| 8 | C | E | 100 |
| 9 | C | F | 100 |

A region of the image with the lowest density is cut out from the obtained 1st and 100th output images, and the cut-out region is accurately weighed. The cut-out and weighed image with the lowest image density is then rubbed with KimWipe (available from Nippon Paper Crecia Co., Ltd.) and weighed again. The weights of the image before and after rubbing with KimWipe are then compared, and the reduction rate is determined in accordance with the following formula.

$$\text{Reduction rate (\%)} = (\text{weight after rubbing with KimWipe})/(\text{weight before rubbing with KimWipe}) \times 100$$

The obtained reduction rate is evaluated on the basis of the following evaluation criteria. A reduction rate of 97% or more is acceptable. The results are shown in Table 3 and Table 4.

Evaluation Criteria

A: The reduction rate is 0% on both the 1st and 100th output images, and no difference can be visually recognized.

B: The reduction rate is 0% on both the 1st and 100th output images, but a reduction in image density on the 100th image can be visually recognized.

C: The reduction rate on at least one of the 1st and 100th output images is 98% or more and less than 100%.

D: The reduction rate on at least one of the 1st and 100th output images is 97% or more and less than 98%.

E: The reduction rate on at least one of the 1st and 100th output images is less than 97%.

Evaluation of Resistance to Thermal Aggregation

Sieves with mesh sizes of 56 μm, 45 μm, and 37 μm are stacked in the order of decreasing mesh size and set on a vibrating table of a powder tester (available from Hosokawa Micron Corporation), and 2 g of a toner in an example is placed as a sample on the set sieves. The vibrating table is vibrated for 90 seconds such that the voltage input to the vibrating table is 15 V and the amplitude of the vibrating table is controlled in the range of 70 to 90 μm. The mass of the sample remaining on each sieve is measured, and the degree of aggregation is calculated in accordance with the following formula.

$$\text{Degree of aggregation (\%)}=(W56/2)\times100+(W45/2)\times100\times0.6+(W38/2)\times100\times0.2$$

In the formula, W56 represents the mass (g) of the sample remaining on the sieve having a mesh size of 56 μm, W45 represents the mass (g) of the sample remaining on the sieve having a mesh size of 45 μm, and W38 represents the mass (g) of the sample remaining on the sieve having a mesh size of 38 μm. The obtained degree of aggregation is evaluated on the basis of the following evaluation criteria. The results are shown in Table 3 and Table 4.

Evaluation Criteria

A: The degree of thermal aggregation is 30% or less.

B: The degree of thermal aggregation is more than 30% and 40% or less.

C: The degree of thermal aggregation is more than 50% and 60% or less.

D: The degree of thermal aggregation is more than 60% and 70% or less.

E: The degree of thermal aggregation is more than 70%.

TABLE 3

| | Binder resin | | | Release agent | | | Toner | | | | | | | |
|---|---|---|---|---|---|---|---|---|---|---|---|---|---|
| | Type | Structure | Tg [° C.] | Type | Amount [parts] | Tm [° C.] | Tm-Tg [° C.] | Lower GSDp | Average circularity | Toluene insoluble matter [parts] | Ma | Mm | Mb |
| Example 1 | 1 | polyester | 58 | ester wax | 3 | 67 | 9 | 1.20 | 0.940 | 2.8 | 3600 | 165000 | 412000 |
| Example 2 | 2 | polyester | 59 | ester wax | 3 | 67 | 8 | 1.21 | 0.941 | 4.6 | 3600 | 205000 | 552000 |
| Example 3 | 3 | polyester | 61 | ester wax | 3 | 67 | 6 | 1.24 | 0.935 | 6.8 | 3600 | 225000 | 725000 |
| Example 4 | 4 | polyester | 59 | ester wax | 3 | 67 | 8 | 1.28 | 0.922 | 2.8 | 5200 | 175000 | 412000 |
| Example 5 | 5 | polyester | 60 | ester wax | 3 | 67 | 7 | 1.26 | 0.918 | 4.6 | 5200 | 210000 | 552000 |
| Example 6 | 6 | polyester | 62 | ester wax | 3 | 67 | 5 | 1.24 | 0.944 | 6.8 | 5200 | 234000 | 725000 |
| Example 7 | 7 | polyester | 58 | ester wax | 3 | 67 | 9 | 1.23 | 0.932 | 2.8 | 7000 | 193000 | 412000 |
| Example 8 | 8 | polyester | 61 | ester wax | 3 | 67 | 6 | 1.25 | 0.928 | 4.6 | 7000 | 221000 | 552000 |
| Example 9 | 9 | polyester | 63 | ester wax | 3 | 67 | 4 | 1.27 | 0.951 | 6.8 | 7000 | 245000 | 725000 |
| Example 10 | 10 | styrene acrylic | 62 | ester wax | 3 | 67 | 5 | 1.35 | 0.920 | 8.8 | 7300 | 248000 | 716000 |

| | Toner | | | | | | | Evaluation | |
|---|---|---|---|---|---|---|---|---|---|
| | Full width at half maximum of Ma | Full width at half maximum of Mb | Ratio (Ha/Hb) | (Mb-Mm)/(Mm-Ma) | A | B | A/B | Resistance to thermal aggregation | Fix-ability |
| Example 1 | 11000 | 309000 | 4.8 | 1.5 | 88 | 12 | 7.3 | B | A |
| Example 2 | 11000 | 425000 | 5.6 | 1.7 | 87 | 13 | 6.7 | A | A |
| Example 3 | 11000 | 541000 | 7.1 | 2.3 | 86 | 14 | 6.1 | A | A |
| Example 4 | 15000 | 309000 | 3.4 | 1.4 | 89 | 11 | 8.1 | B | A |
| Example 5 | 15000 | 425000 | 3.9 | 1.7 | 88 | 12 | 7.3 | A | A |
| Example 6 | 15000 | 541000 | 5.0 | 2.1 | 87 | 13 | 6.7 | A | A |
| Example 7 | 21000 | 309000 | 2.4 | 1.2 | 90 | 10 | 9.0 | B | B |

TABLE 3-continued

| | | | | | | | | | |
|---|---|---|---|---|---|---|---|---|---|
| Example 8 | 21000 | 425000 | 2.8 | 1.5 | 89 | 11 | 8.1 | A | B |
| Example 9 | 21000 | 541000 | 3.5 | 2.0 | 88 | 12 | 7.3 | A | B |
| Example 10 | 27000 | 720000 | 3.8 | 1.9 | 88 | 12 | 7.3 | B | B |

TABLE 4

| | Binder resin | | | Release agent | | | Toner | | | | | | |
|---|---|---|---|---|---|---|---|---|---|---|---|---|---|
| | Type | Structure | Tg [° C.] | Type | Amount [parts] | Tm [° C.] | Tm-Tg [° C.] | Lower GSDp | Average circularity | Toluene insoluble matter [parts] | Ma | Mm | Mb |
| Example 11 | 1 | polyester | 58 | paraffin wax | 3 | 92 | 34 | 1.38 | 0.913 | 2.8 | 3600 | 165000 | 412000 |
| Example 12 | 11 | polyester | 58 | ester wax | 3 | 67 | 9 | 1.26 | 0.930 | 4.6 | 3700 | 164000 | 412000 |
| Example 13 | 5 | polyester | 60 | ester wax | 0.4 | 67 | 7 | 1.25 | 0.922 | 4.6 | 5200 | 210000 | 552000 |
| Example 14 | 5 | polyester | 60 | ester wax | 5 | 67 | 7 | 1.28 | 0.934 | 4.6 | 5200 | 210000 | 552000 |
| Comparative Example 1 | c1 | polyester | 74 | ester wax | 3 | 67 | −7 | 1.28 | 0.930 | 2.1 | 2100 | 31000 | 198000 |
| Comparative Example 2 | c2 | polyester | 82 | ester wax | 3 | 67 | −15 | 1.25 | 0.922 | 11.4 | 2100 | 401000 | 1105000 |
| Comparative Example 3 | c3 | polyester | 84 | ester wax | 3 | 67 | −17 | 1.23 | 0.933 | 2.1 | 10500 | 52000 | 198000 |
| Comparative Example 4 | c4 | polyester | 91 | ester wax | 3 | 67 | −24 | 1.22 | 0.949 | 11.4 | 10500 | 420000 | 1105000 |
| Comparative Example 5 | c5 | polyester | 67 | ester wax | 3 | 67 | 0 | 1.25 | 0.923 | 4.6 | none | none | 552000 |
| Comparative Example 6 | c6 | polyester | 46 | ester wax | 3 | 67 | 21 | 1.25 | 0.935 | 0.5 | 5200 | none | none |
| Comparative Example 7 | c7 | polyester | 50 | ester wax | 3 | 67 | 17 | 1.23 | 0.946 | 2.1 | 3000 | 34000 | 198000 |

| | Toner | | | | | | | Evaluation | |
|---|---|---|---|---|---|---|---|---|---|
| | Full width at half maximum of Ma | Full width at half maximum of Mb | Ratio (Ha/Hb) | (Mb-Mm)/(Mm-Ma) | A | B | A/B | Resistance to thermal aggregation | Fixability |
| Example 11 | 11000 | 309000 | 4.8 | 1.5 | 88 | 12 | 7.3 | B | B |
| Example 12 | 15000 | 425000 | 3.9 | 1.5 | 88 | 12 | 7.3 | A | A |
| Example 13 | 15000 | 425000 | 3.9 | 1.7 | 88 | 12 | 7.3 | A | B |
| Example 14 | 15000 | 425000 | 3.9 | 1.7 | 88 | 12 | 7.3 | B | A |
| Comparative Example 1 | 6000 | 155000 | 2.1 | 5.8 | 78 | 22 | 3.5 | E | D |

TABLE 4-continued

| | | | | | | | | | |
|---|---|---|---|---|---|---|---|---|---|
| Comparative Example 2 | 6000 | 850000 | 9.5 | 1.8 | 72 | 28 | 2.6 | E | C |
| Comparative Example 3 | 30000 | 155000 | 0.5 | 3.5 | 80 | 20 | 4.0 | E | D |
| Comparative Example 4 | 30000 | 850000 | 21.0 | 1.7 | 76 | 24 | 3.2 | E | E |
| Comparative Example 5 | none | none | none | none | none | none | none | A | E |
| Comparative Example 6 | none | none | none | none | none | none | none | E | D |
| Comparative Example 7 | 7000 | 155000 | 8.2 | 5.3 | 90 | 8 | 11.3 | E | A |

The above results indicate that Examples show better fixability and higher resistance to thermal aggregation than Comparative Examples.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A toner for electrostatic charge image development comprising toner particles containing a binder resin including 90 mass % or more of an amorphous resin, wherein, in a differential molecular weight distribution curve of tetrahydrofuran soluble matter as measured by gel permeation chromatography, the toner has:

a maximum peak Ma in a molecular weight range of 2,500 or more and 8,000 or less;

a minimum value Mm in a molecular weight range of more than 8,000 and less than 280,000; and a maximum peak Mb in a molecular weight range of 280,000 or more and 900,000 or less, and when an area of the differential molecular weight distribution curve in a range of a molecular weight of 100 or more and less than the minimum value Mm is defined as A, and an area of the differential molecular weight distribution curve in a range of the minimum value Mm or more and a molecular weight of 10,000,000 or less is defined as B, an area ratio A/B is 5.5 or more and 10 or less.

2. The toner for electrostatic charge image development according to claim 1, wherein the maximum peak Ma, the minimum value Mm, and the maximum peak Mb satisfy a relationship (Mb−Mm)/(Mm−Ma) of 1.0 or more and 2.4 or less.

3. The toner for electrostatic charge image development according to claim 1, wherein the toner particles further contain a release agent.

4. The toner for electrostatic charge image development according to claim 3, wherein the release agent contains an ester wax.

5. The toner for electrostatic charge image development according to claim 3, wherein the release agent is present in an amount of 0.5 mass % or more and 4 mass % or less relative to the toner particles.

6. The toner for electrostatic charge image development according to claim 3, wherein the release agent has a melting temperature of 57° C. or higher and 68° C. or lower.

7. The toner for electrostatic charge image development according to claim 3, wherein a difference (Tm−Tg) between the melting temperature Tm of the release agent and a glass transition temperature Tg of the amorphous resin is 0° C. or more and 10° C. or less.

8. The toner for electrostatic charge image development according to claim 1, wherein the toner particles have an average circularity of 0.915 or more and 0.950 or less.

9. The toner for electrostatic charge image development according to claim 1, wherein the toner particles have a small-diameter-side number particle size distribution index (lower GSDp) of 1.33 or less.

10. The toner for electrostatic charge image development according to claim 1, wherein the toluene insoluble matter accounts for 3 mass % or more and 8 mass % or less of the toner particles.

11. The toner for electrostatic charge image development according to claim 1, wherein the amorphous resin contains an amorphous polyester resin.

12. An electrostatic charge image developer comprising the toner for electrostatic charge image development according to claim 1.

13. An image forming apparatus comprising:

an image holding member;

a charging unit that charges a surface of the image holding member;

an electrostatic charge image forming unit that forms an electrostatic charge image on the charged surface of the image holding member;

a developing unit that stores the electrostatic charge image developer according to claim 12 and develops the electrostatic charge image on the surface of the image holding member by using the electrostatic charge image developer to form a toner image;

a transfer unit that transfers the toner image on the surface of the image holding member to a surface of a recording medium; and a fixing unit that fixes the toner image that has been transferred to the surface of the recording medium.

14. A toner for electrostatic charge image development comprising toner particles containing a binder resin including 90 mass % or more of an amorphous resin, wherein, in a differential molecular weight distribution curve of tetrahydrofuran soluble matter as measured by gel permeation chromatography, the toner has:

a maximum peak Ma in a molecular weight range of 2,500 or more and 8,000 or less;

a minimum value Mm in a molecular weight range of more than 8,000 and less than 280,000; and a maximum peak Mb in a molecular weight range of 280,000 or more and 900,000 or less, the maximum peak Ma has a full width at half maximum of 12,000 or more and 20,000 or less, the maximum peak Mb has a full width at half maximum of 320,000 or more and 500,000 or less, and a ratio (Ha/Hb) of a height Ha of the maximum peak Ma to a height Hb of the maximum peak Mb is 2.7 or more and 6.0 or less.

* * * * *